United States Patent [19]
Hindson

[11] Patent Number: 5,902,003
[45] Date of Patent: May 11, 1999

[54] MOTOR VEHICLE COVER WITH LOW PROFILE HOUSING AND INFLATABLE SIDE CHAMBERS

[76] Inventor: Thomas William Hindson, 7810 NW. 40th St., Coral Springs, Fla. 33065

[21] Appl. No.: 08/874,976

[22] Filed: Jun. 13, 1997

Related U.S. Application Data

[63] Continuation-in-part of application No. 08/781,134, Jan. 10, 1997, Pat. No. 5,823,607.

[51] Int. Cl.⁶ ...................................................... B60J 11/00
[52] U.S. Cl. ............................................ 296/136; 293/128
[58] Field of Search ........................... 296/136; 293/128; 150/166; 160/84.02, 84.06, 370.21, 370.22, 370.23

[56] References Cited

U.S. PATENT DOCUMENTS

| | | | |
|---|---|---|---|
| 4,294,483 | 10/1981 | Ferris | 296/136 |
| 4,699,192 | 10/1987 | Kamen et al. | 296/136 X |
| 5,176,421 | 1/1993 | Fasiska | 296/136 |
| 5,242,206 | 9/1993 | Heck | 296/136 |

Primary Examiner—Andrew C. Pike
Attorney, Agent, or Firm—Malin, Haley, DiMaggio & Crosby, P.A.

[57] ABSTRACT

An apparatus used to protect a motor vehicle has a low profile housing placed below a rear bumper of the vehicle, and a cover placed within the housing in an accordion-like fashion. In one embodiment, an electric motor drives a roller belt assembly which frictionally engages with the cover to provide a force to aid a user in either the extension from or the retraction into the housing of the cover. In an alternate embodiment, the roller assembly includes webbing material geometrically positioned to prevent the cover from becoming entangled in the rollers. At least one roller assembly can be flexibly positioned to permit even force to be applied to the cover during extension from and retraction into the housing even if the cover becomes bunched to one side of the roller assembly. The electric motor is controlled from an extension handle attached to a forward portion of the cover. The vehicle cover can include a protective cushion that can be at least one inflatable air chamber to protect at least a portion of the vehicle when the cover is extended over the vehicle. An air pump attached to the housing inflates the air chamber when the handle is attached to a front portion of the vehicle. An exhaust valve in the handle deflates the air chamber for storage in the housing.

4 Claims, 19 Drawing Sheets

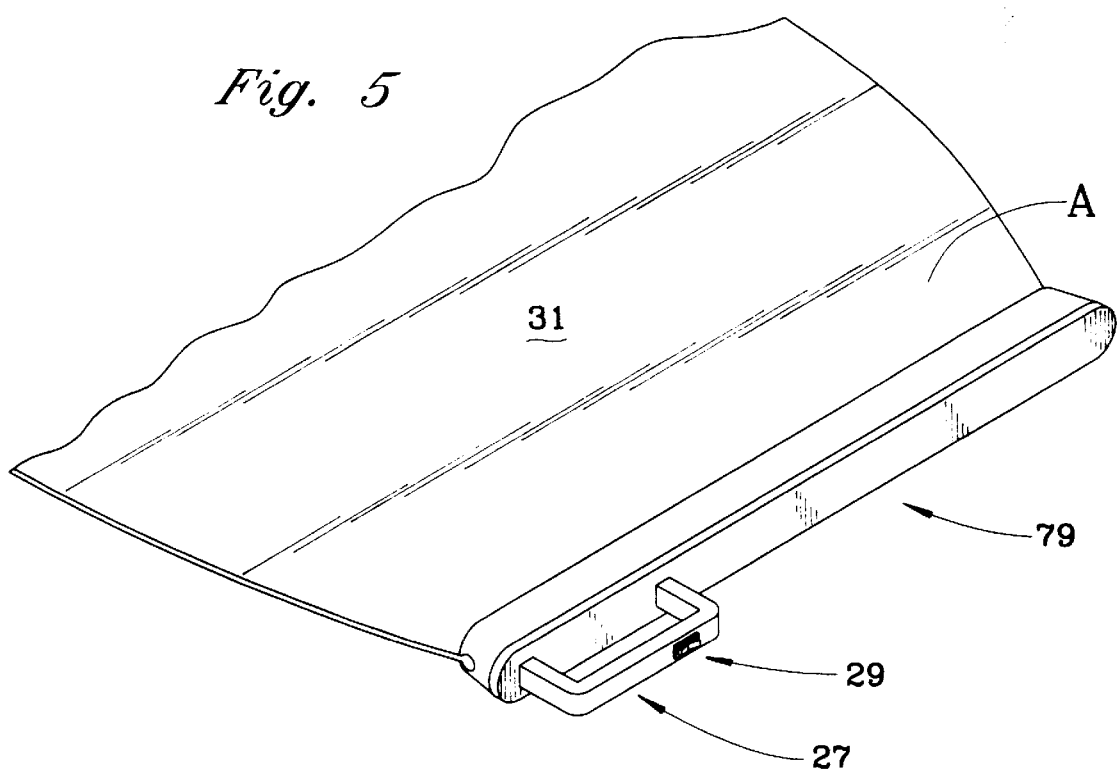
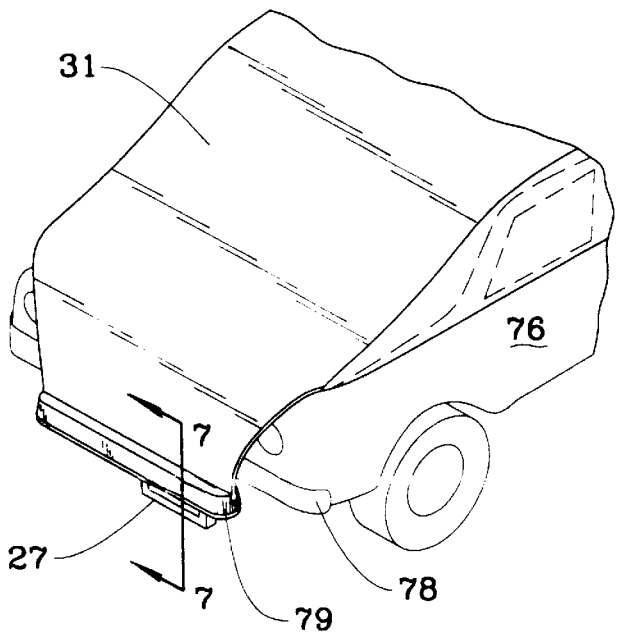
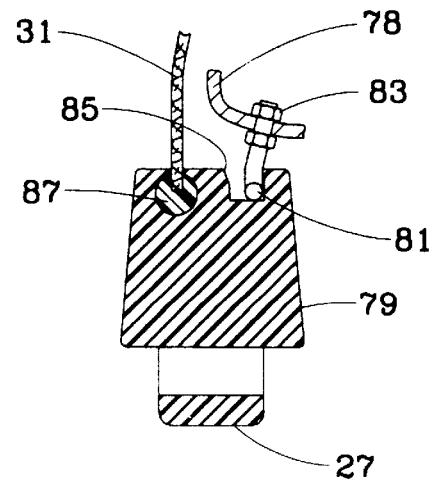

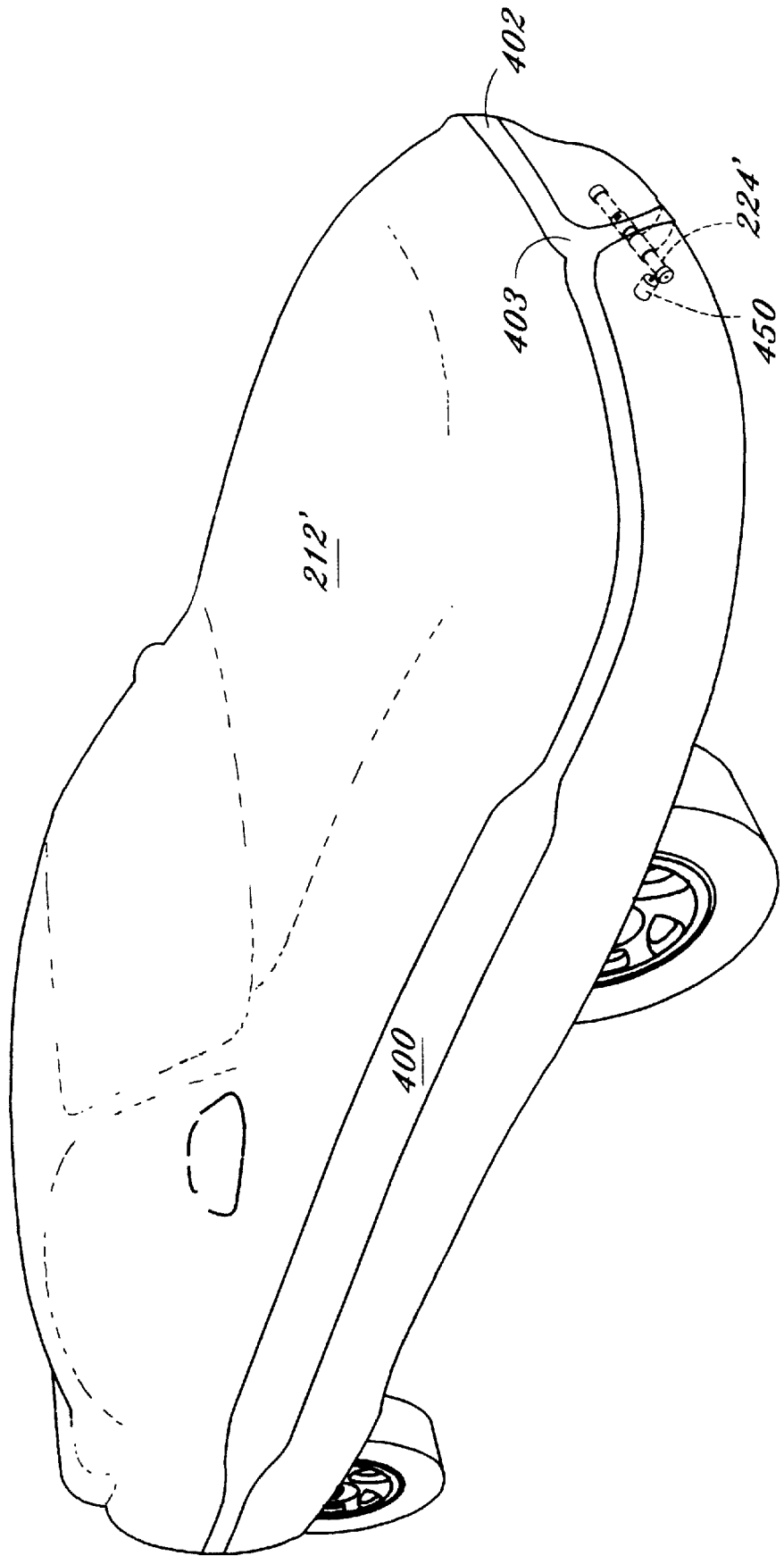

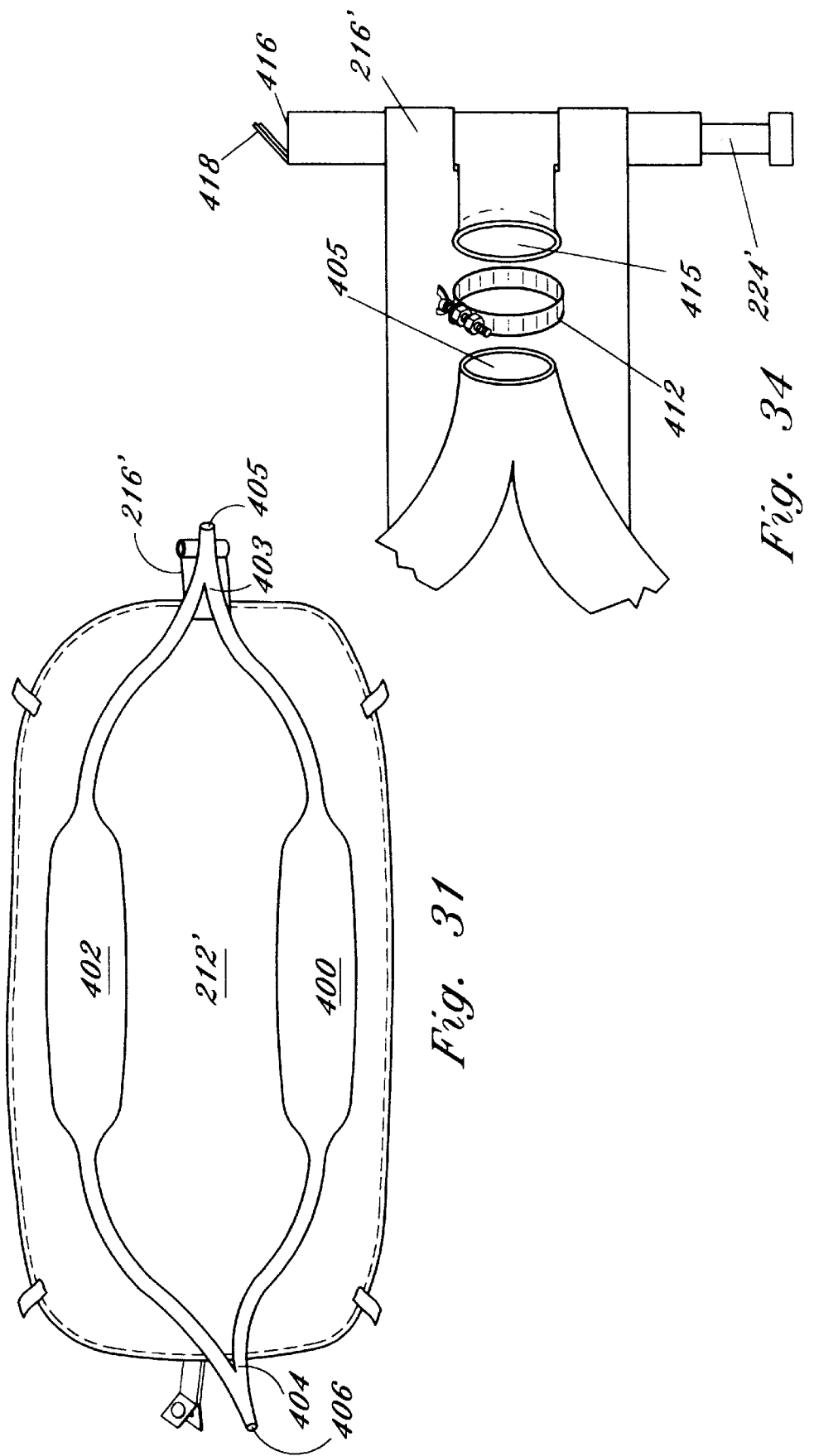

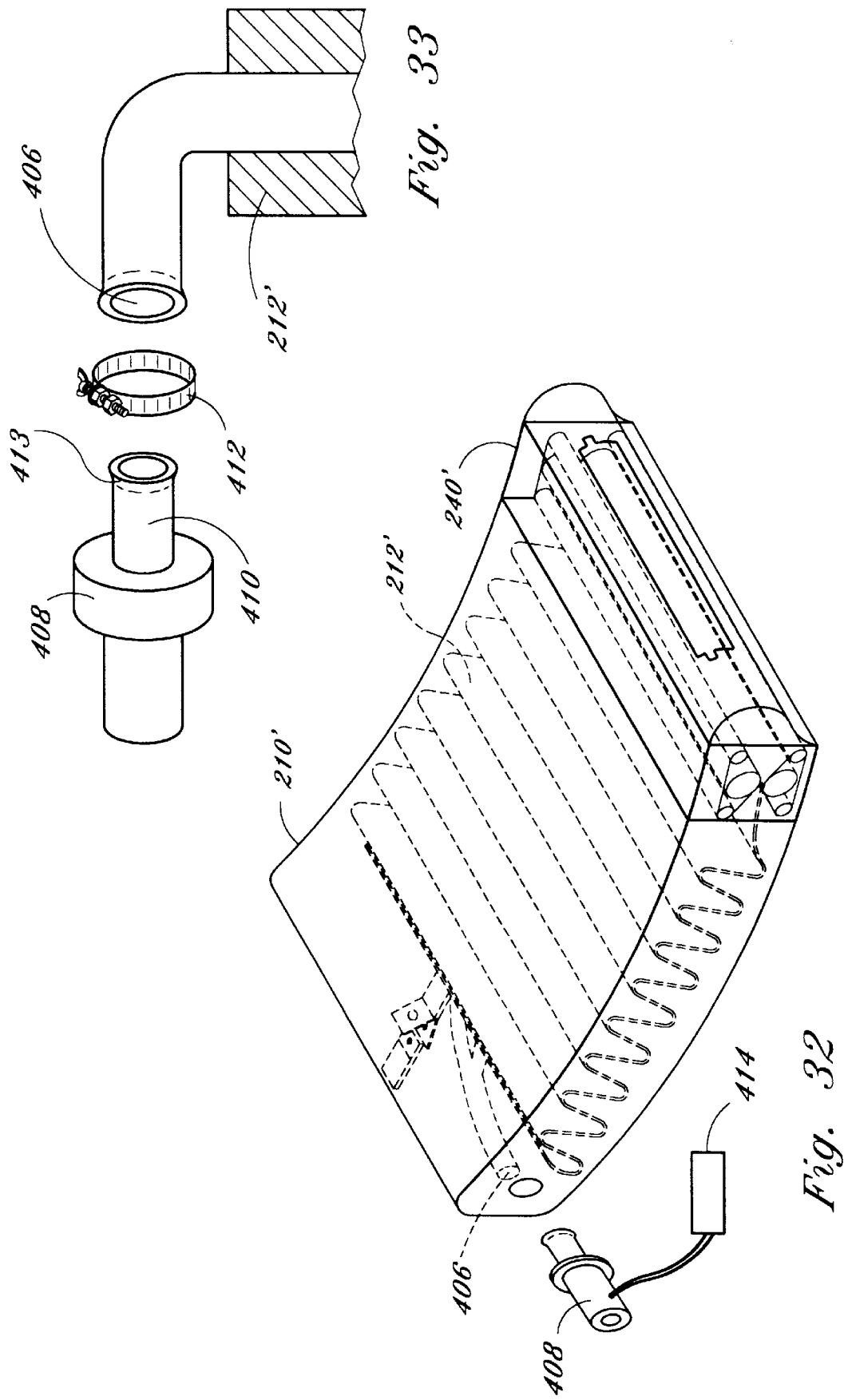

MOTOR VEHICLE COVER WITH LOW PROFILE HOUSING AND INFLATABLE SIDE CHAMBERS

This application is a continuation-in-part of application Ser. No. 08/781,134, filed Jan. 10, 1997, now U.S. Pat. No. 5,823,607.

BACKGROUND OF THE INVENTION

1. Field of the Invention

The present invention relates to a cover assembly for a motor vehicle which is retractable for storage into a low profile housing attached to the understructure of a vehicle. More specifically, the present invention relates to an apparatus which occupies minimal space for deploying, retracting, and storing a cover designed to protect the interior and/or exterior of a vehicle.

2. Description of the Prior Art

There are many settings and circumstances in which an automobile must be parked or stored without the benefit of a protective garage or enclosure. The auto is thus exposed to the elements, and usually suffers from the exposure. Dirt, dust, tree sap, bird droppings, dew, ice, snow, etc. may collect on the surface of the auto, rendering cleaning and even driving of the auto problematical. In the summer months, or in areas with arid or tropical climates, the sun radiating down on a vehicle not only degrades the exterior finish of the vehicle, but also makes the passenger compartment quite uncomfortable due to the excessive heat buildup.

To overcome these problems, vehicle covers constructed of fabric or plastic and made to form-fit a particular vehicle have become popular. These covers may be stored in the trunk of the vehicle or elsewhere in a folded state, and then taken out and spread over the vehicle to provide protection. Although providing protection for the vehicle from the elements, such covers present a number of drawbacks. First, the cover must be manually placed on the vehicle, manually removed, and then folded. Not only is this procedure time consuming and, for some, annoying, it is also cumbersome and difficult for one person to manage, particularly with larger vehicles. In addition, difficulty affixing or aligning the cover into position presents a major obstacle to continued use of the cover.

To overcome these problems, automatically extending and retracting vehicle covers have been developed. Typically, these devices wind the covers onto manually operated or motor driven axles, which result in a bulky spool of cover material which is unsightly and occupies significant and valuable space.

It is therefore desirable to provide a convenient, selfstoring vehicle cover which is easy for even an elderly, small, or feeble person to use regularly without the usual exertive and time consuming movements required by prior art devices.

SUMMARY OF THE INVENTION

The present invention features a vehicle cover and deployment, retrieval, and storage assembly which avoids the aforementioned problems associated with the prior art. The cover assembly of the present invention does not decrease the storage space within the automobile, provides means for easy setup and removal of the cover, and is substantially hidden from visual inspection.

The invention includes a vehicle cover, a low profile housing or pod, and a cover deployment and retrieval operating mechanism positioned therein. The housing is substantially hidden from view when installed. The operating mechanism includes a pair of rollers, at least one of which, a drive roller, is drivingly connected to a motor. A second, or driven, roller is positioned above the drive roller to prevent bunching of the cover or screen during retraction or deployment.

In a preferred embodiment, a webbing material surrounds each roller, including at least one guide roller, to produce a geometric-shaped rotating webbing protector, that prevents the vehicle cover material from rolling over onto itself and becoming jammed in the rollers.

The cover is designed to protect the top of the vehicle as well as the sides and all windows if desired. It is sleek in appearance and provides the traditional vehicle cover functions. In one embodiment, the cover is constructed of multi-ply medium gauge fabric including cotton which may include side flaps to cover the sides of a vehicle. The cover is bunched or folded in a linear fashion into the housing to save space and insure ease of movement during deployment or retraction. The cover can be detachable from the system for washing or for replacement.

A handle is attached to the distal end of the cover for a user to grasp while manipulating the cover. For self protection, the handle can include a housing to hold a container of MACE® tear, or pepper type self defense gas, including means to propel the gas in the direction of a would be assailant. MACE® is a registered trademark for a lacrimator agent such as chloracetophenone (CN) or orthochlorbenzalmalononitrle (CS), an inflammation agent such as oleorensin of capsilum (OC), or blends such as CN/CS, CN/OC, or CS/OC. The handle can alternately house a stun gun, or a siren or alarm, and can include a device to activate an alarm system mounted in the vehicle.

The handle can be locked to the front end of the vehicle when the vehicle cover is deployed and in place covering the vehicle. Only the owner will be able to unlock the handle, when locked to the front of the vehicle, to remove the cover. If a thief attempts to cut the cover off, an alarm can be triggered to sound. In addition, the handle can be colored a bright fluorescent color, such as international orange, so that if a thief tries to take the vehicle by cutting off the cover and disabling the alarm, the bright handle attached to the front end of the vehicle will alert police that the vehicle has been stolen.

The handle is preferably made of a suitable material such as polyvinylchloride (Pvc), but can alternately be made of a hard material such as metal that can further be used as a self-defense club.

One embodiment of the cover includes a protective cushion integral with, or connected to, the cover that protects the vehicle from damage due to opening doors of adjacent vehicles, commonly called "door dings", shopping carts, and other hazards as may be found when parked. The protective cushion can be any shape or size, and can be made of any suitable material such as foam, rubber, polyvinylchloride, cotton or synthetic fabric, and the like.

A preferred embodiment includes inflatable air chambers that protect the vehicle from the above mentioned damage. An air pump automatically inflates the air chambers to a preselected maximum pressure upon deployment of the cover. The handle includes an openable valve to provide for deflation of the air chambers for storage of the cover.

In one embodiment, the housing, or pod, is made of a combination of high impact composite such as plastic with an aluminum upper portion that is secured flush against the underside of the vehicle. The connection between the aluminum and plastic is made such that the pod can be flexed enough to tightly fit beneath the lower rear end of nearly all automobiles. The aluminum upper portion of the housing pod is used instead of plastic because of the aluminum's better ability to conduct heat, and is needed to separate the pod from hot areas that may exist on the underside of the automobile.

While the parameters and dimensions of the housing pod should not be considered limiting to the present invention, in the preferred embodiment the housing's dimensions are 26"×24"×4". The design and performance characteristics of the housing are numerous including that it hides and protects the cover when not in use and it protects the trunk of the vehicle and its contents from wet or soiled covers. Drainage holes can be provided in the bottom of the housing which allows the housing to drain after the cover is retracted into the housing when wet or snow covered. Further, the housing protects the cover from airborne contaminants and road damage and also enhances the vehicle's ground effects by flattening irregular vehicle bottom topographies. Finally, the housing opens in a way which is conducive to system maintenance, allowing easy access to the motor and roller/belt mechanisms.

In one embodiment, the operating mechanism includes a roller assembly comprised of two resilient rollers covered or coated with polyurethane-type plastic and configured like a clothes wringer washer, wherein one of the rollers, a drive roller, is motor driven, and the other one of the rollers, a driven roller, is free spinning to maintain compression on the cover. The drive motor is powered by the vehicle's battery which responds to user commands via a switch on the handle. The motor drives the roller assembly in either a clockwise or counterclockwise fashion and should have sufficient torque capacity to overcome friction forces between the cover and the vehicle's exterior, even when wet. The motor, when attached to a 2" drive roller, should operate in an rpm range so as to pass approximately 210" of cover in under ten seconds. This is approximately the time it should take a person to walk from the front end of a vehicle to the rear end of a vehicle while applying the cover. The motor assists the user in deploying or retracting the cover.

When the two rollers are set in motion via activation of the motor, they propel the vehicle cover from inside the housing where it may then be guided over the exterior of the vehicle using the handle. After extension of the cover by the user, a slotted recess defined by a cover end member is brought into engagement with a T-shaped engagement pin attached to the vehicle's front end. When the user later wishes to drive the vehicle, he simply disengages the engagement pin from the cover end member and reverses the motor's direction by use of the handle switch. In this way, the cover is easily retracted back into the housing pod.

The dual roller mechanism of the present invention eliminates several of the inherent disadvantages of prior motorized systems. For example, it allows a straight line or folded storage of the cover instead of the much bulkier spool arrangements known in the art. The result is a low profile housing/cover arrangement easily hidden under the vehicle. Because of the unique retraction and deployment structure, retraction and deployment of the cover occurs at a constant speed. The rate of movement is the same at the beginning of the operation as it is at the end, making it safer to use than spool arrangements, the retrieval of which increases nonlinearly in speed as the diameter of the roll increases. The twin rollers in the preferred embodiment also give a positive movement to the cover in both directions. Wound systems are only positive in the retrieve mode. The tension roller and drive roller further provide both a cleaning and wringing action to the cover when wet. The cover will dry faster when deployed and resist mildew longer when stored in the housing. The cover end member and handle may be formed of high impact plastic and perform a variety of functions. The handle forms an extension of the user's hand that is used to draw and guide the cover on and off of the vehicle. As such it is light and easy to control. By means of this handle, the user never has to touch the vehicle cover, which may be wet, dirty, or both.

The handle includes an activation switch which, in the preferred embodiment, is a normally off, two-way, three-position rocker switch. Movement of the switch into a first, deployment position energizes the motor and drive roller rotatably in a first direction which deploys the cover. Movement of the switch into a second, retrieval, position energizes the motor and drive roller rotatably in a second direction which reverses the action and retrieves the cover. In either case, if the switch is released, the switch automatically assumes a third, off, position in which cover movement is stopped, thus providing a failsafe arrangement against unwanted movement of the cover.

In the preferred embodiment, the drive and driven rollers are surrounded by a webbing material which also wraps around at least one guide roller forming a geometric-shaped webbing protector that prevents the cover material from wrapping around the rollers causing the rollers to jam. Preferably there are two guide rollers associated with the drive and driven rollers, forming a pair of triangular-shaped webbed protectors. Without the webbing protectors, the cover material may wrap completely around one of the rollers jamming the drive mechanism.

The webbing protector is made of a suitable material such as nylon or plastic, and is characterized by large openings surrounded by thin bands or strips of material, similar to a nylon or plastic chain-link fence. Hence, during operation, the surface of the rollers, which are adjacent each other, are primarily in contact with the vehicle cover material and not the webbing material, thus providing the frictional drive force that deploys and retracts the cover. However, when the webbing material departs from the surface of the drive or driven roller and heads for a guide roller, the webbing material pulls the cover material along with it and away from the drive and driven rollers, thus preventing the cover material from jamming the rollers.

An additional, and unexpected, benefit occurred from the solution of the jamming problem described herein above. During retraction, the cover material rides between the drive and driven rollers and, because of being guided by the triangular-shaped webbing protector, falls into nearly perfect accordion-type folds on the inside of the housing. The nearly perfect folding action of the cover by the webbing protector results in the cover fitting into a very compact package. Therefore, the webbing protector not only solves the roller jamming problem, but permits use of a smaller housing pod because of the improved folding that occurs during retraction. The smaller housing pod results in installations being behind the axle assemblies of most vehicles.

During operation of the device, when the cover is evenly distributed across the moving surface of the rollers, the drive and driven rollers are substantially parallel to each other. In this position, the driving force across the rollers, and acting on the cover material, is evenly distributed. However, when operating the device a user must normally stand to one side of the vehicle. Depending on the user's position, the cover may bunch to one side of the moving rollers. If the rollers only operated in a fixed parallel relationship to each other, the bunching of the cover material to one side could bind and jam the mechanism. Therefore, to maintain proper alignment and even driving force along the rollers, a mechanism to permit relative movement of the rollers from parallel to an inclined angle had to be developed.

The preferred embodiment of the present invention permits operation of the drive and driven rollers when parallel to each other or when inclined to one another at nearly any acute angle. The rollers maintain a nearly evenly distributed driving force on the cover material, even when the cover material is bunched to one side of the rollers. The driven roller is attached in spaced relationship to the drive roller in a resilient manner that provides flexibility in the end-to-end orientation, or angle, of the driven roller to the drive roller, and that maintains even force across the cover material.

It is evident that there is a need for an auto cover assembly that is easily deployed and stored. The prior art discloses several forms of self-storing auto covers, usually easily deployable and mechanically or automatically retracted for storage. However, these devices take up unnecessary storage space because they are all wound on a spool, the diameter of which increases as more cover material is retrieved.

Accordingly, it is a principal object of the present invention to provide a substantially hidden, motor driven, semi-automatic vehicle cover and storage apparatus which is easily deployed and retrieved.

Another object of the present invention is to provide a low profile vehicle cover assembly which allows a straight line storage of the cover instead of the much bulkier spool-like storage.

A further object of the present invention is to provide a vehicle cover roller assembly, wherein both a cleaning and wringing action is administered to the cover when the cover is deployed and retrieved.

Yet another object of the present invention is to provide a vehicle cover roller assembly that prevents jamming due to the cover material wrapping around the rollers, and permits use of a very compact housing.

Still another object of the present invention is to provide a vehicle cover that includes a control handle with built-in self-defense measures.

Yet a further object of the present invention is to provide a vehicle cover that includes antitheft measures.

Another object of the present invention is to provide protective cushions, which can be inflatable air chambers, within the cover to protect the vehicle from damage due to opening doors of adjacent vehicles.

In accordance with these and other objects which will be apparent hereinafter, the instant invention will now be described with particular reference to the accompanying drawings.

BRIEF DESCRIPTION OF THE DRAWINGS

FIG. 5 is a top perspective view as in FIG. 2, showing the cover partially deployed.

FIG. 6 is a perspective view of a portion of a vehicle with the cover of the first embodiment fully deployed and attached to the retention member.

FIG. 7 is a cross-sectional view, taken along line 7—7 of FIG. 6, of the cover end member, handle, recess, and retention member.

FIG. 30 is a perspective view of an alternate embodiment of the cover used in the third embodiment of the present invention illustrated deployed on a vehicle.

FIG. 31 is a top plan view of the cover of FIG. 30.

FIG. 32 is a perspective view of the third embodiment of the present invention illustrated utilizing the cover of FIG. 30.

FIG. 33 is a perspective view of the attachment of the cover of FIG. 30 to the inflation air pump.

FIG. 34 is a top plan view of the handle for use with the cover of FIG. 30.

DESCRIPTION OF THE PREFERRED EMBODIMENTS

I. First Embodiment

Figure 1:
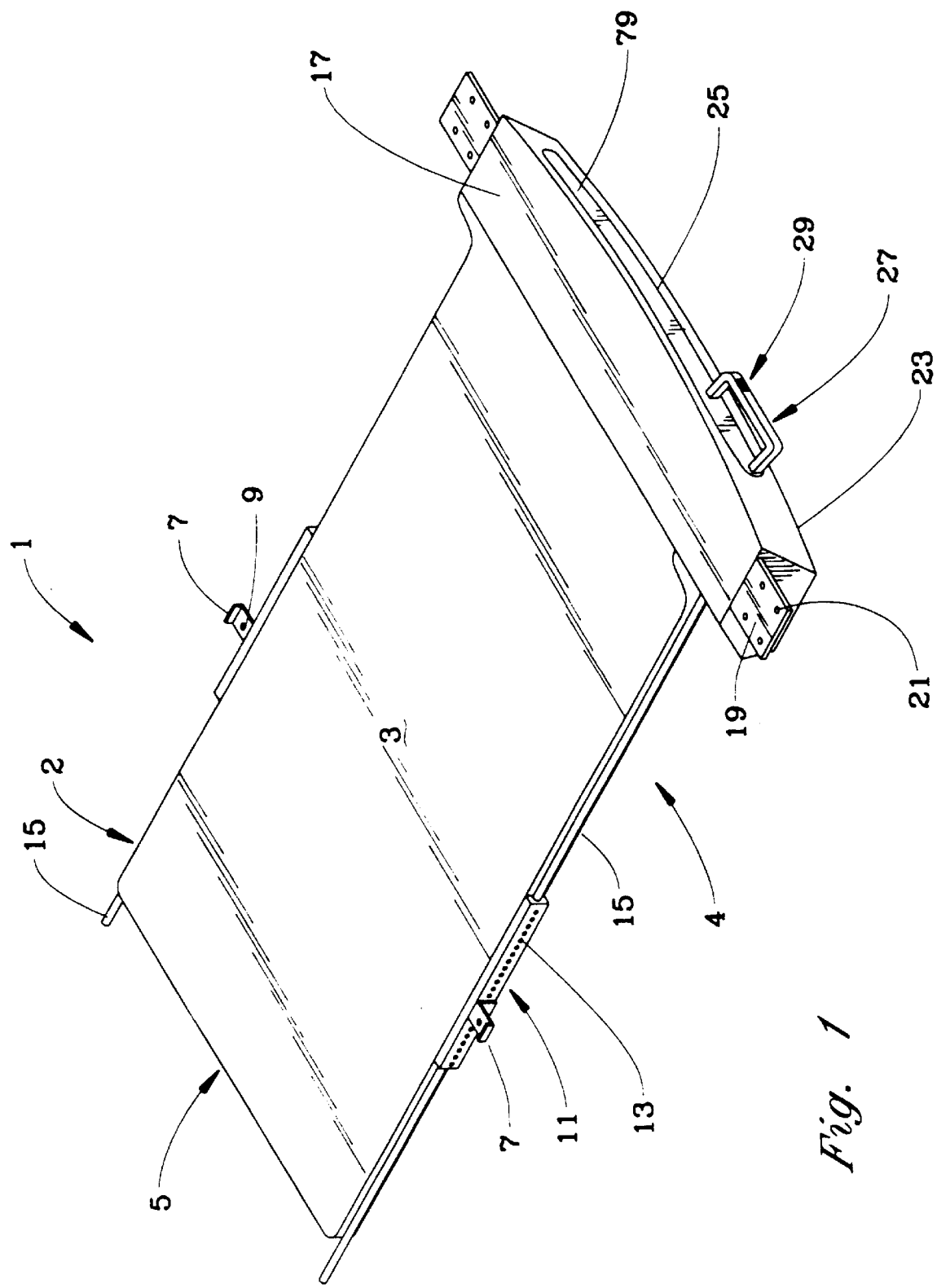
FIG. 1 is a top perspective view of a first embodiment of the invention.
Figure 2:
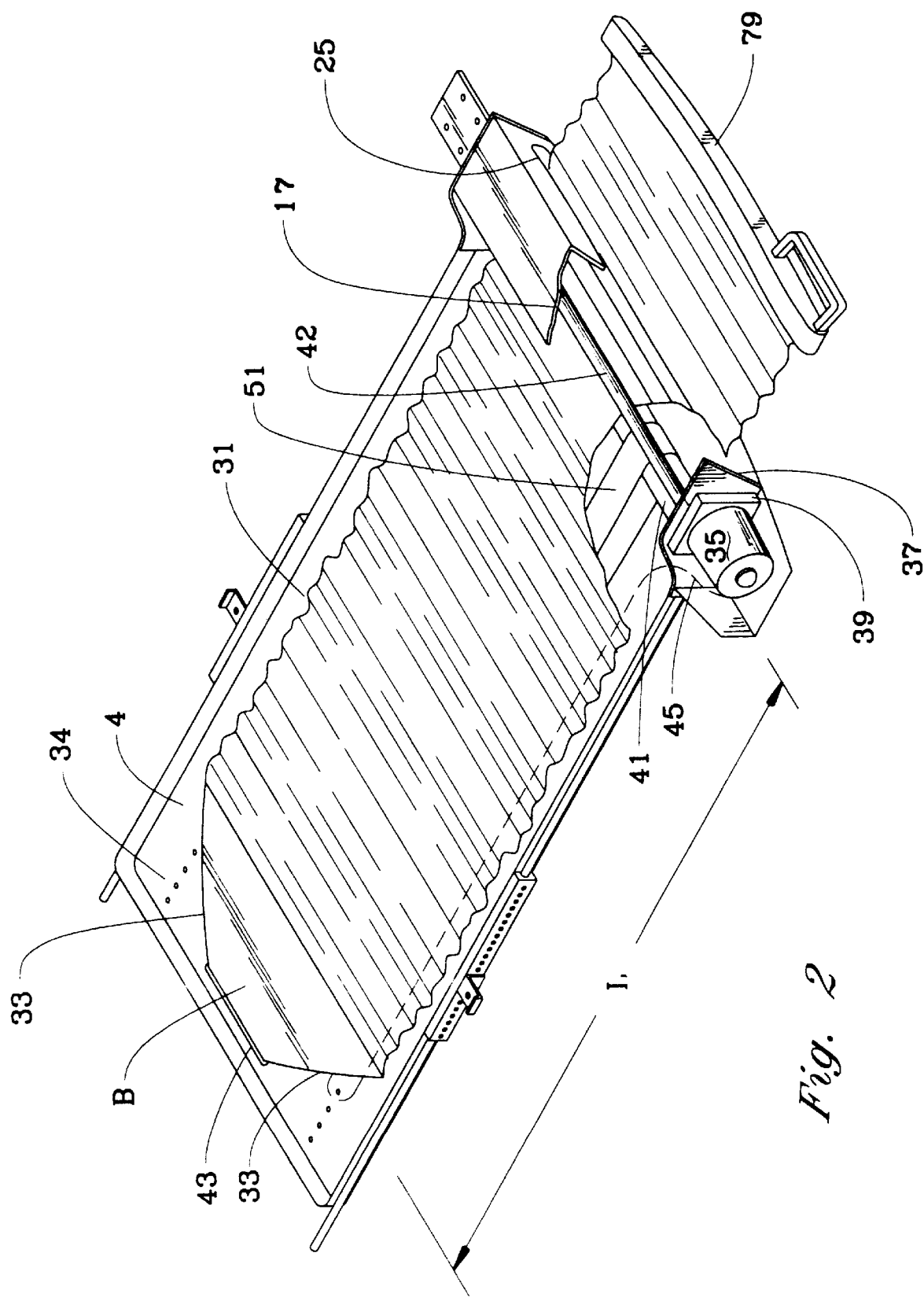
FIG. 2 is a partial cutaway top perspective view of a first embodiment of the invention.

Referring now in more detail to the drawings, and in particular to FIG. 1 and FIG. 2, a first embodiment of the present invention is shown generally at 1 and includes a housing 2 having a housing upper panel 3, housing lower panel 4, and housing rear end panel 5. Each of the aforementioned panels define a narrow low profile cavity which houses a vehicle cover or screen 31. The housing extends under the vehicle and is supported to the vehicle underside by housing support brackets 7. An aperture or hole 9 allows attachment of each bracket 7 to the vehicle by way of any known connector (not shown). Housing support brackets 7 may be adjusted or positioned anywhere along adjustment brackets 11 which are attached to side members 15. Adjustment brackets 11 include adjustment apertures 13 for attachment thereto of brackets 7.

Figure 8:
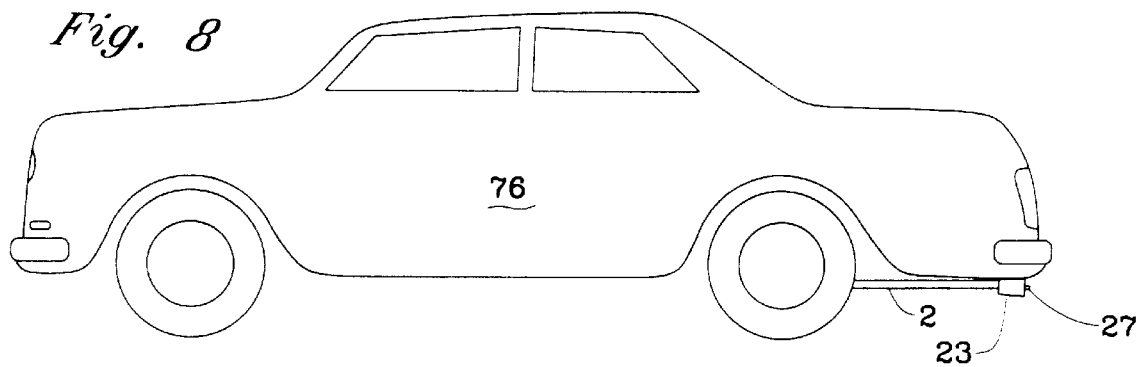
FIG. 8 is a side elevational view of the vehicle equipped with the first embodiment of the invention and the cover stored.

Similarly, the forward portion of housing 2 is attached to the vehicle by drive assembly mounting plate 19 with corresponding attachment apertures 21. Ideally, this portion of the housing 2 is mounted to or directly behind the vehicle's rear bumper assembly. A forward portion, or drive housing, 17 includes front panel 23 defining an aperture 25. An operator handle 27 is attached to cover end member 79 which is in turn attached to the distal end A of the cover 31. Distal end A of cover 31 is tapered inwardly to meet end member 79 as shown in FIGS. 5 and 6. Housing 2, with cover 31 in the retracted position, is shown mounted to an automobile 76 in FIG. 8.

Referring to FIG. 2, the housing 2 is shown with upper panel 3 removed, exposing cover 31. Cover 31 is shown in a retracted position and is folded longitudinally in order to conserve space and aid in the ease of movement during the extension and retraction process. Cover 31 extends to the rear of housing 4, where it may be tapered inwardly as at 33 and attached to a stop member 43 or other means connected to the proximal end B of cover 31 to prevent the end of cover 31 from being removed from the housing assembly when fully extended. The distance between the outer surfaces of the drive and driven rollers should be less than the diameter or thickness of stop member 43. In the preferred embodiment, cover 31 is removable from stop member 43, allowing the cover to be fully removed from the housing for cleaning. Stop member 43 may also be eliminated. Drainage holes 34 at the rear of the housing lower panel 4 allow liquid and vapor to escape, avoiding mildew.

Figure 4:
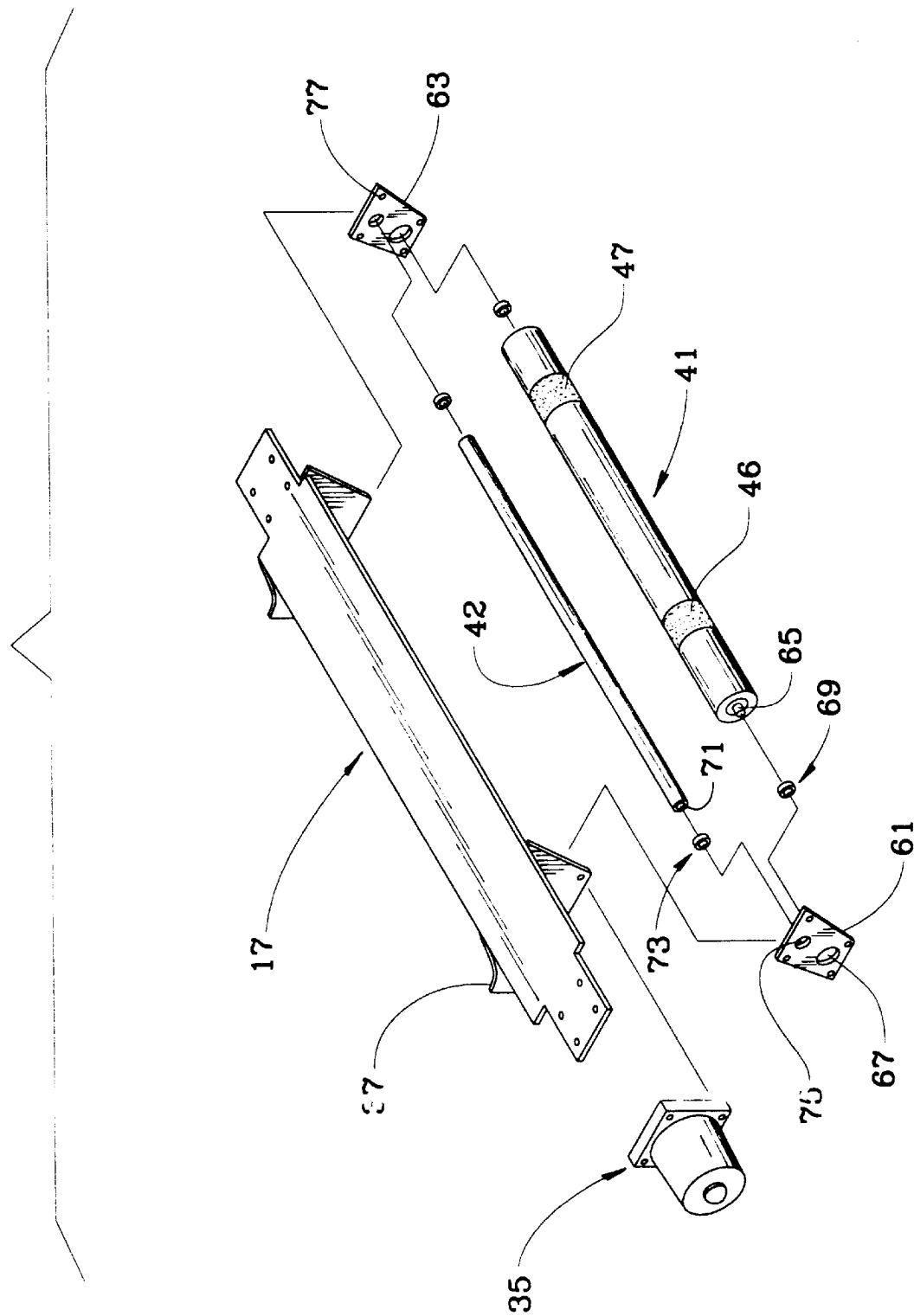
FIG. 4 is an exploded view of the drive roller and driven roller assemblies of the first embodiment of the invention.

When cover 31 is deployed from the housing, it passes between drive roller 41 and driven roller 42. The drive roller 41 is driven or rotated about its longitudinal axis by drive motor 35. Drive motor 35 is secured through attachment bushing 39 to the lower housing 4 by bracket 37. FIG. 4 illustrates an exploded view of the complete roller assembly.

Roller 41 may be coated with a dense 2 lb. polyurethane to enhance its ability to impart movement to cover 31. Said roller 41 may also have a dense 21 lb. polyurethane coating covering portions 46, 47, as shown in FIG. 4 thereof adapted to be engaged by belts 51, 53 as shown in FIG. 3.

Drive motor 35 may be a one-half inch, 12-volt DC, reversible gear motor, Dayton model 1L475. It is powered by attaching control wire 45 to switch 29 on control handle 27, which is attached to the 12-volt DC source, i.e., car battery. Control wire 45 is connected, e.g., woven, with or into cover 31 with a free length L (shown in phantom in FIG. 2) of the wire remaining free inside housing 2. When the cover 31 is fully extended or deployed, the free length L of control wire 45 extends partially outside the housing. Ideally, control wire 45 includes a male and female connector (not shown), so that when the cover is used without a stop bar 43, the cover may be removed from the housing and the male and female connector disconnected for easy separation and cleaning.

Figure 3:
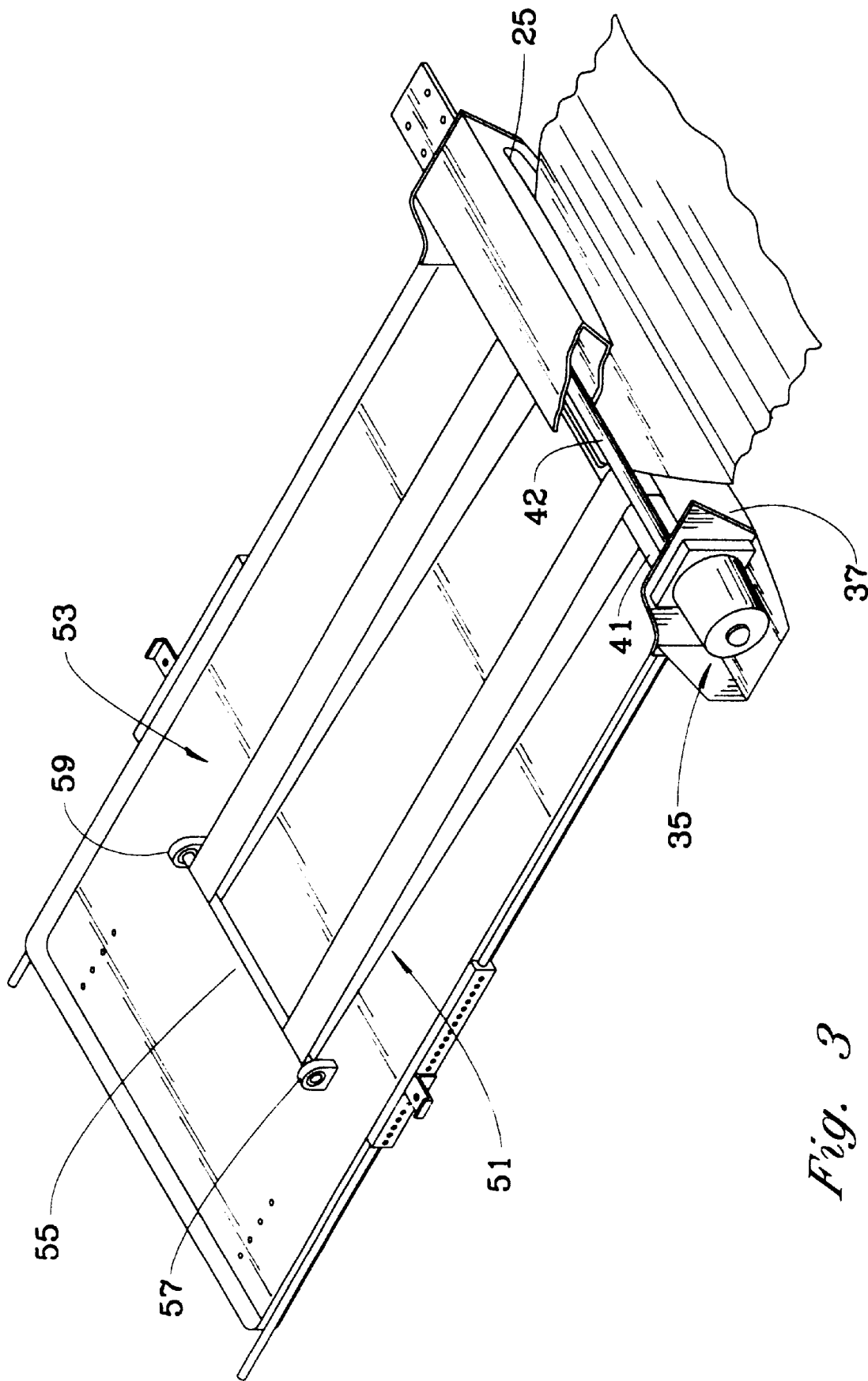
FIG. 3 is a partial cutaway top perspective view of a first embodiment of the invention with the vehicle cover fully deployed.

With reference to FIG. 3, the vehicle cover mechanism further includes frictional cover engagement belts 51 and 53. Belts 51 and 53 are driven at one end by drive roller 41 and rotate about spindle 55. Spindle 55 is free-spinning and rotatably attached to housing 2 in any convenient manner by bearings and/or brackets 57 and 59. Belts 51 and 53 should have a high coefficient of friction relative to the material chosen for cover 31, and may be standard rubber neoprene belts.

Drive motor 35 rotates belts 51, 53 in either a forward or reverse direction, depending on the respective electrical polarity fed to the motor. Polarity is determined by the user when actuating switch 29 which is connected in series with motor 35, as seen in FIGS. 1 and 5. Cover 31 rests upon and frictionally engages belts 51 and 53 during deployment and retraction. The high friction coefficient surface on the belts grips the softly textured surface of cover 31 and provides a force which easily moves the cover to either an extended or retracted position, depending on the direction of the motor.

FIG. 4 is an exploded view of the roller assembly. Drive roller 41 includes threaded studs 65 at each end which extend through a spacer washer 69 and is attached with brackets 61 and 63. Attachment brackets 61 and 63 are positioned against the inward or roller side of the drive motor support bracket 37, and attached by suitable fasteners, such as bolted, through apertures 77. One of the threaded studs at one end of the drive roller 41 is then rigidly attached to the motor, through aperture 67, to the output shaft (not shown) of drive motor 35. Similarly, the driven roller 42 includes studs 71 and spacer washer 73. Studs 71 extend through aperture 75, where they are secured by way of a standard nut and bolt assembly, but driven roller 42 remains free spinning in order to maintain a force of compression upon the surface of cover 31 to prevent bunching of material during retraction or extension.

FIG. 5 is an enlarged view of the cover guide member 79 and control handle 27 with three-position switch 29. Cover end member 79 is rigidly attached to the front end of cover 31 by way of any convenient connection means such as, for example, an elongated strip 87 in FIG. 7 of resilient material connected to the distal end A of cover 31. When the user grips control handle 27, switch 29 can be moved to select the direction of rotation of the output shaft of drive motor 35. The length of cover end member 79 is short enough to enable it to occupy and cover aperture 25, yet long enough to attach to an optimal length of cover 31. This facilitates a greater ease in the deployment or retraction process since the user has control of a substantial width of cover 31 which will cover a greater surface area of the vehicle. The user may then cover the vehicle without having to release the cover handle 27. The vehicle can then be covered in one continuous motion rather than requiring the user to move to the opposite side of the vehicle in order to insure correct cover alignment.

It is to be noted that end member 79 may be provided with a recessed handle in lieu of exposed handle 27. In that event, switch means 29 may be placed in any convenient position relative to such recessed handle.

Figure 9:
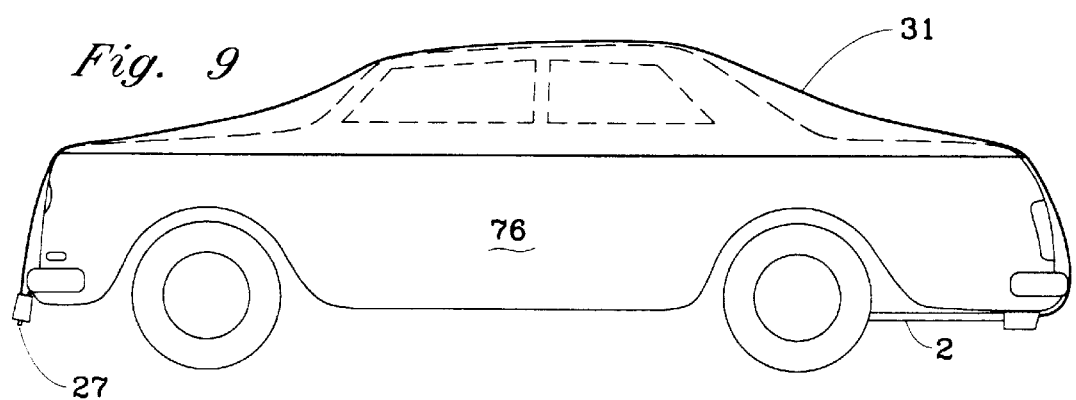
FIG. 9 is a side elevational view of the vehicle equipped with the first embodiment of the invention and the cover deployed and covering the vehicle.
Figure 10:
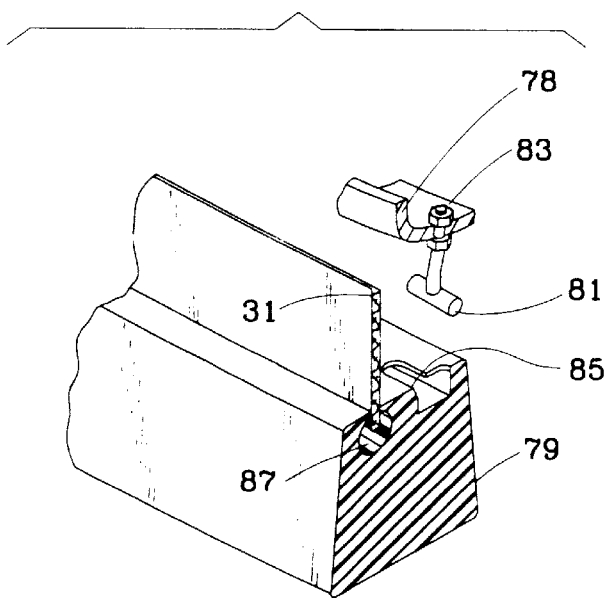
FIG. 10 is a cross-sectional isometric view of the first embodiment of the cover retention apparatus.

FIGS. 6 and 9 illustrate cover 31 extended over an automobile 76. Now referring to FIG. 10, cover end member 79 further includes a recess 85. A retention member 81 is fixedly attached to the underside of the vehicle's front end 78, which may be a bumper, a body panel, or other suitable member. In operation, a user simply engages the slotted recess 85 with retention member 81 to hold the cover 31 in place.

FIGS. 7 and 9 illustrate a deployed cover retention apparatus for the first embodiment of the invention wherein retention member 81 is engageable within slotted recess 85. A nut and bolt assembly 83 attaches the retention member 81 to the vehicle bumper 78. The retention member 81 may be a T-shaped element depending from the vehicle's front end. Other suitable means for attaching the distal end A of cover 31 to the front end 78 of the vehicle are contemplated to be within the scope of this invention.

Cover 31 may be provided with elastic material along side edges thereof to provide a tight fit over the vehicle (not shown).

II. Second Embodiment

Figure 11:
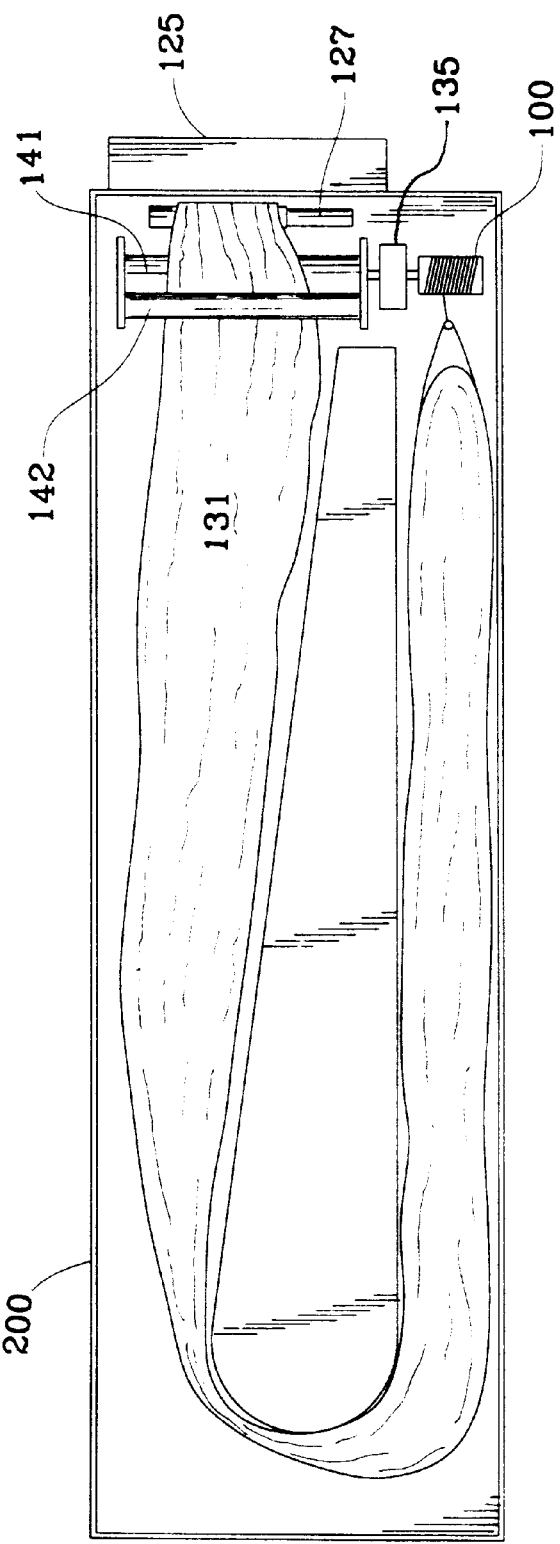
FIG. 11 is a cutaway plan view of a second embodiment of the present invention.

In FIG. 11, a second embodiment of the present invention shows motor 135 connected to trace spool 100. Trace spool 100 is connected to the rear end of vehicle cover 131. Motor 135 rotates trace spool 100 at the same speed as drive roller 141. During take-up, as vehicle cover 131 is pulled into housing 200 by drive roller 141 and driven roller 142, trace spool 100 rotates and pulls the rear end of vehicle cover 131 into the housing. During deployment, trace spool 100 rotates in the opposite direction releasing the rear of vehicle cover 131 at same rate of deployment controlled by rollers 141 and 142. The cooperation between the trace spool 100, drive roller 141, and driven roller 142 maintains a positive transport pressure on vehicle cover 131 during take-up and deployment.

Motor 135, trace spool 100, drive roller 141, and driven roller 142 can be configured to deploy and retract vehicle cover 131 at nearly any desired speed, but is preferably set to a rate of approximately three feet per second.

Figure 12:
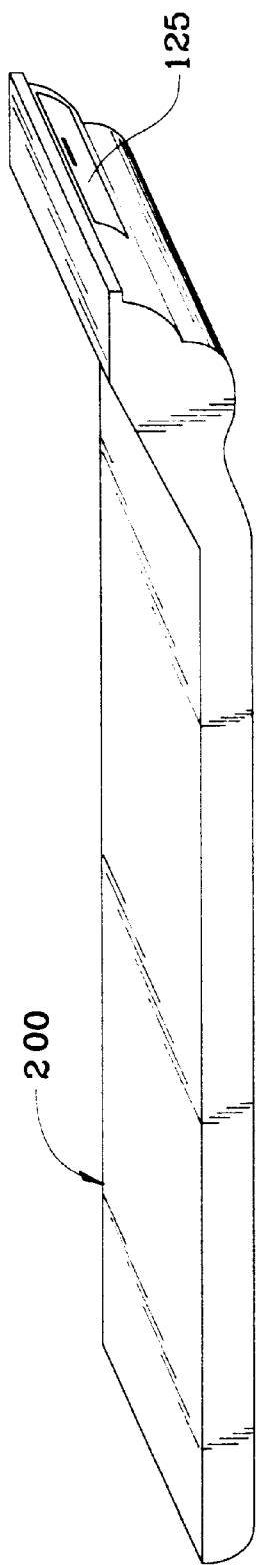
FIG. 12 is a perspective view showing the housing of the second embodiment of the present invention.

Door 125 is shown in the open position in FIG. 11 and in the closed position in FIG. 12. Door 125 provides easy access to handle 127, protection from road dirt, and, if installed with a key locking mechanism (not shown), protection from theft of cover 131.

Housing 200 of the second embodiment, shown in FIG. 12, has approximate dimensions of 2 feet wide by 7 feet long by 6 inches deep.

III. Third Embodiment

Figure 14:
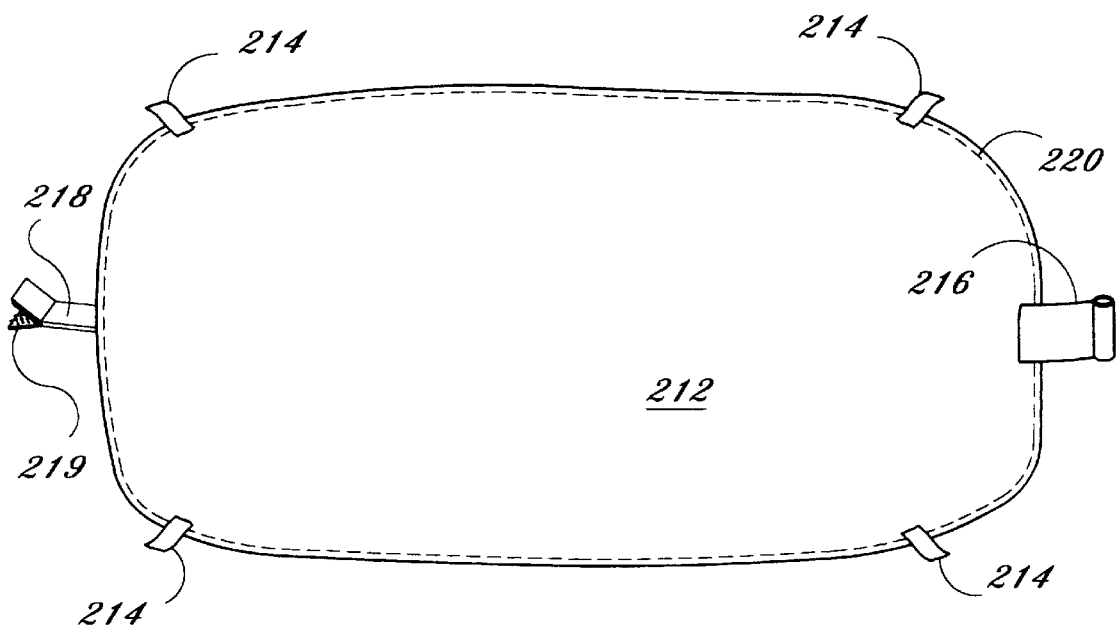
FIG. 14 is top plan view of the cover used in the third embodiment of the present invention.
Figure 13:
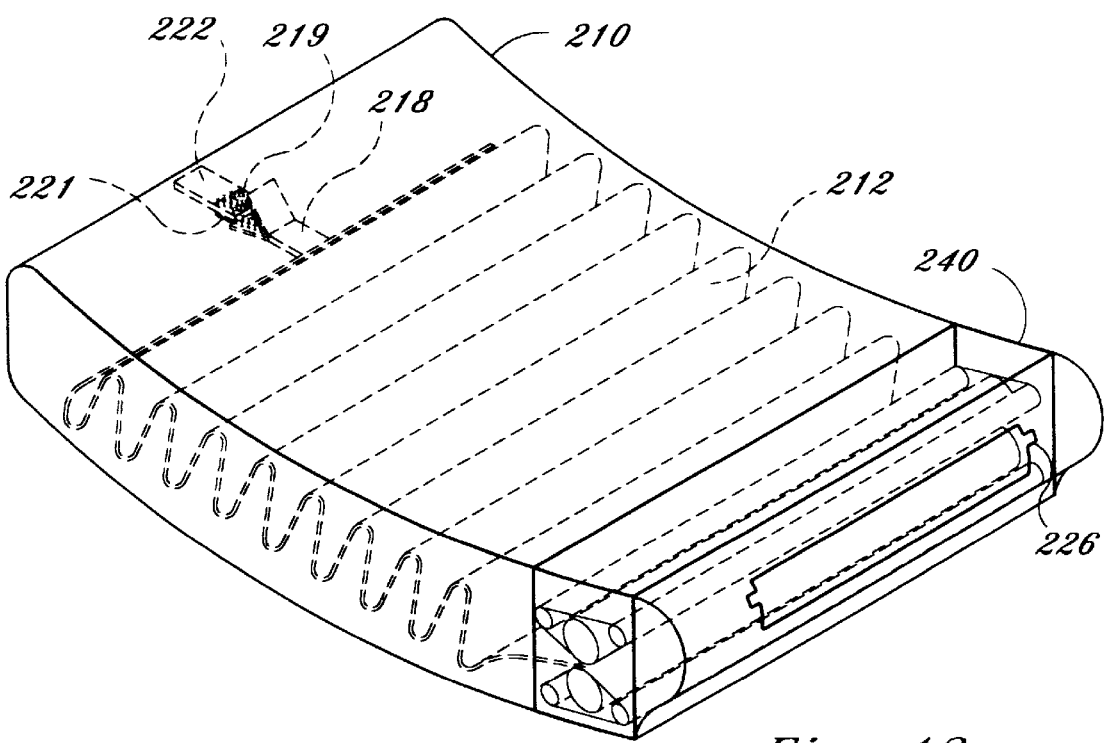
FIG. 13 is a perspective view of a third embodiment of the present invention.

Referring now to FIGS. 13–27, a third, and preferred, embodiment of the present invention is shown. Referring in particular to FIG. 13, vehicle cover 212 in shown retracted and stored, folded in accordion-like fashion, in housing pod 210. Referring also to FIG. 14, vehicle cover 212 includes handles 214, sleeve 216, attachment member 218, and expandable or elastic perimeter piece 220. Attachment member 218 connects cover 212 to the rear inside area of housing pod 210 at tab 222, by a suitable fastener 219, which engages with mating fastener 221 on tab 222. Fasteners 219 and 221 are shown as hook and loop type fasteners, but can be any suitable fasteners such as snaps, buttons, zippers, and the like. Tab 222 can be made sufficiently long such that cover 212 can be fully removed from housing pod 210. Cover 212 can thus easily and quickly be removed from housing 210 for cleaning or replacement.

Cover 212 can be made of any suitable material such as spunbound olefin or TYVEK®, and can support sophisticated graphical color printing to customize the cover appearance.

When cover 212 is in place over a vehicle, elastic perimeter piece 220 retains the cover under the lower edges of the vehicle and helps keep cover 212 in place, even in windy conditions. Handles 214 makes it easier for a user to pull the cover off of the vehicle in preparation for retraction back into housing 210. Sleeve 216 attaches cover 212 to handle 224, shown in FIGS. 18–20, as will be fully described hereinbelow.

Figure 15:
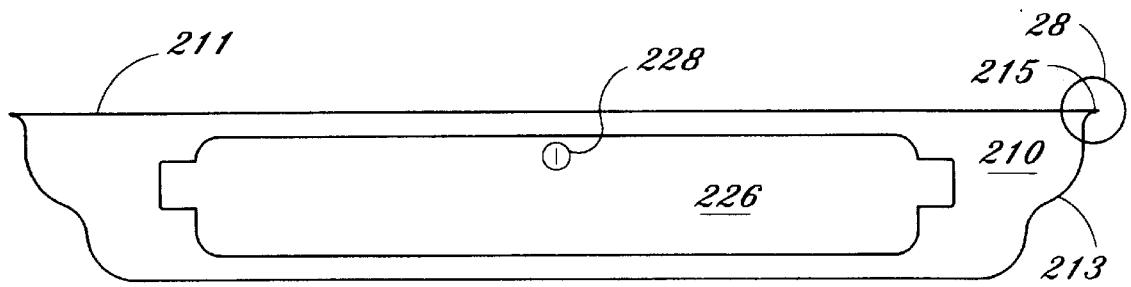
FIG. 15 is a front elevational view of the third embodiment of the present invention.
Figure 16:
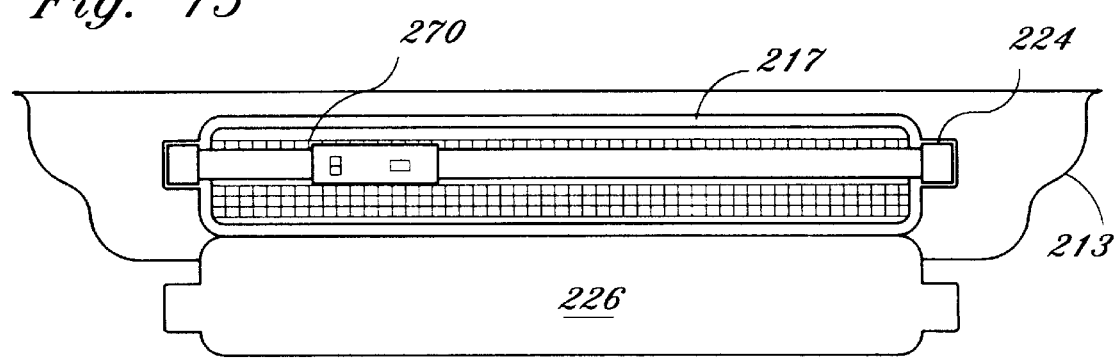
FIG. 16 is a front elevational view of the third embodiment of the present invention.
Figure 17:
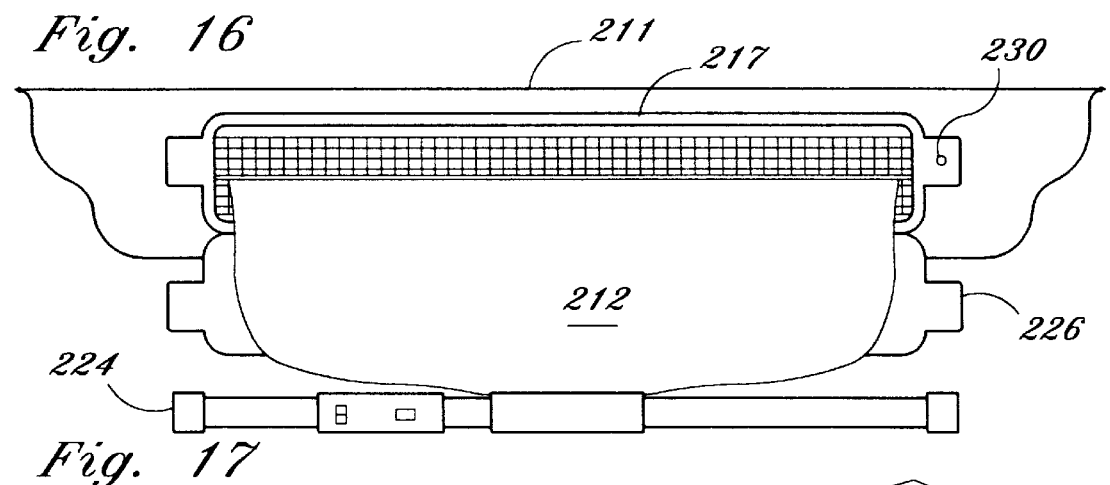
FIG. 17 is a front elevational view of the third embodiment of the present invention.

Referring now to FIGS. 13 and 15–17, handle 224 is stored behind door 226, and is used to extend and retract cover 212 from housing pod 210. The extension and retraction of cover 212 is accomplished by roller drive assembly 240, which is fully described hereinbelow. Entry and exit of cover 212 into and out of housing 210 is aided by smooth contoured mouth 217, as shown in FIGS. 16 and 17. Contoured mouth 217 reduces the friction between cover 212 and housing 210 thus producing a "slippery" fabric stream upon entry and exit of cover 212 from housing 210.

Door 226 includes locking means 228, as shown in FIG. 15. When handle 224 is stored behind door 226, handle 224 engages push button switch 230. Switch 230 deactivates drive motor 245 of roller assembly 240, as described hereinbelow, to prevent inadvertent activation of motor 245.

Housing pod 210 can be made of a combination of upper portion 211 and lower portion 213. Lower portion 213 is preferably made of a molded plastic material and upper portion 211 is preferably aluminum. Aluminum is chosen because of aluminum's ability to conduct heat away from hot spots that may exist under the rear area of vehicles where housing pod 210 is intended to be attached, thereby protecting cover 212 when stored inside housing 210.

Figure 28:
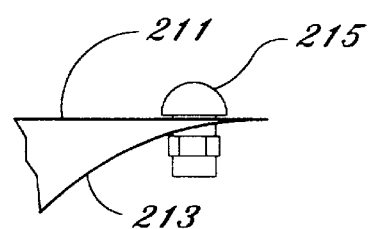
FIG. 28 is an enlargement of the circular area 28 shown in FIG. 15.
Figure 29:
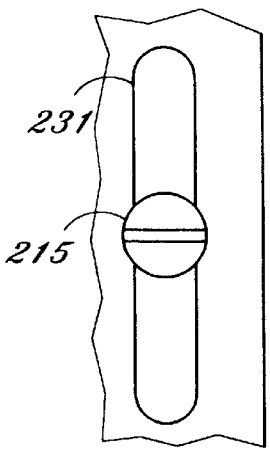
FIG. 29 is a top plan view of that illustrated in FIG. 28.

To make housing pod 210 custom fit the rear undercarriage of most vehicles, housing pod 210 can be made flexible to mold itself to various undercarriage shapes. Referring to FIGS. 28 and 29, one embodiment of a flexible assembly technique is shown where upper portion 211 is mounted to lower portion 213 by bolt 215 engaging into slot 231 provided in either upper piece 211 or lower piece 213. Housing pod 210 can thus be flexed to conform to nearly any vehicle's undercarriage, and still be bolted together without the necessity of a special housing for each vehicle. In addition, without this flexible attachment feature permitting housing pod 210 to be conformed to the undercarriage of the vehicle, the housing pod 210 would protrude under the vehicle causing undesirable aerodynamic drag.

Figures 18, 19:
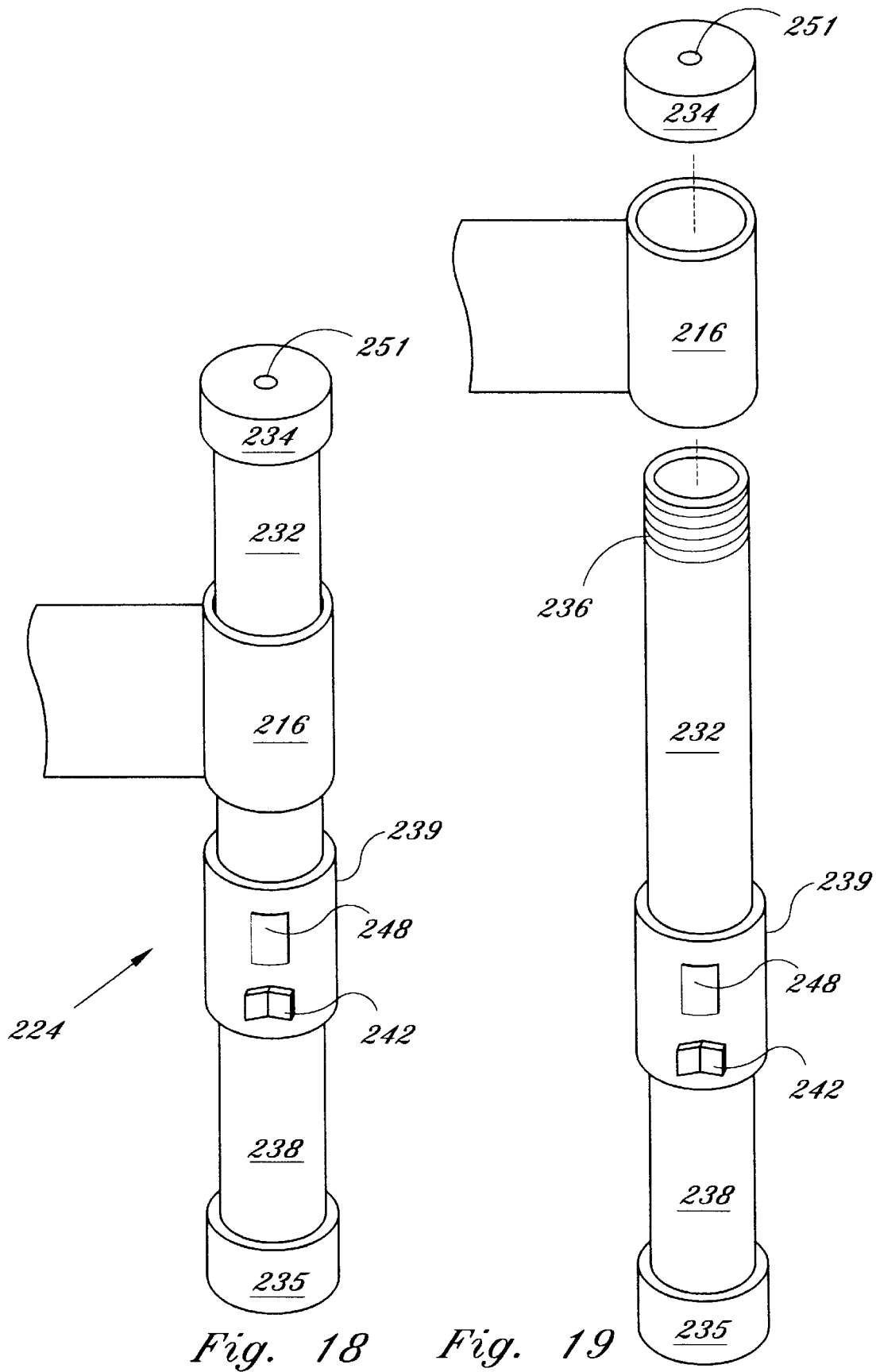
FIG. 18 is a front elevational view of the handle of the third embodiment of the present invention.
FIG. 19 is a partially exploded front elevational view of the handle of the third embodiment of the present invention.
Figure 20:
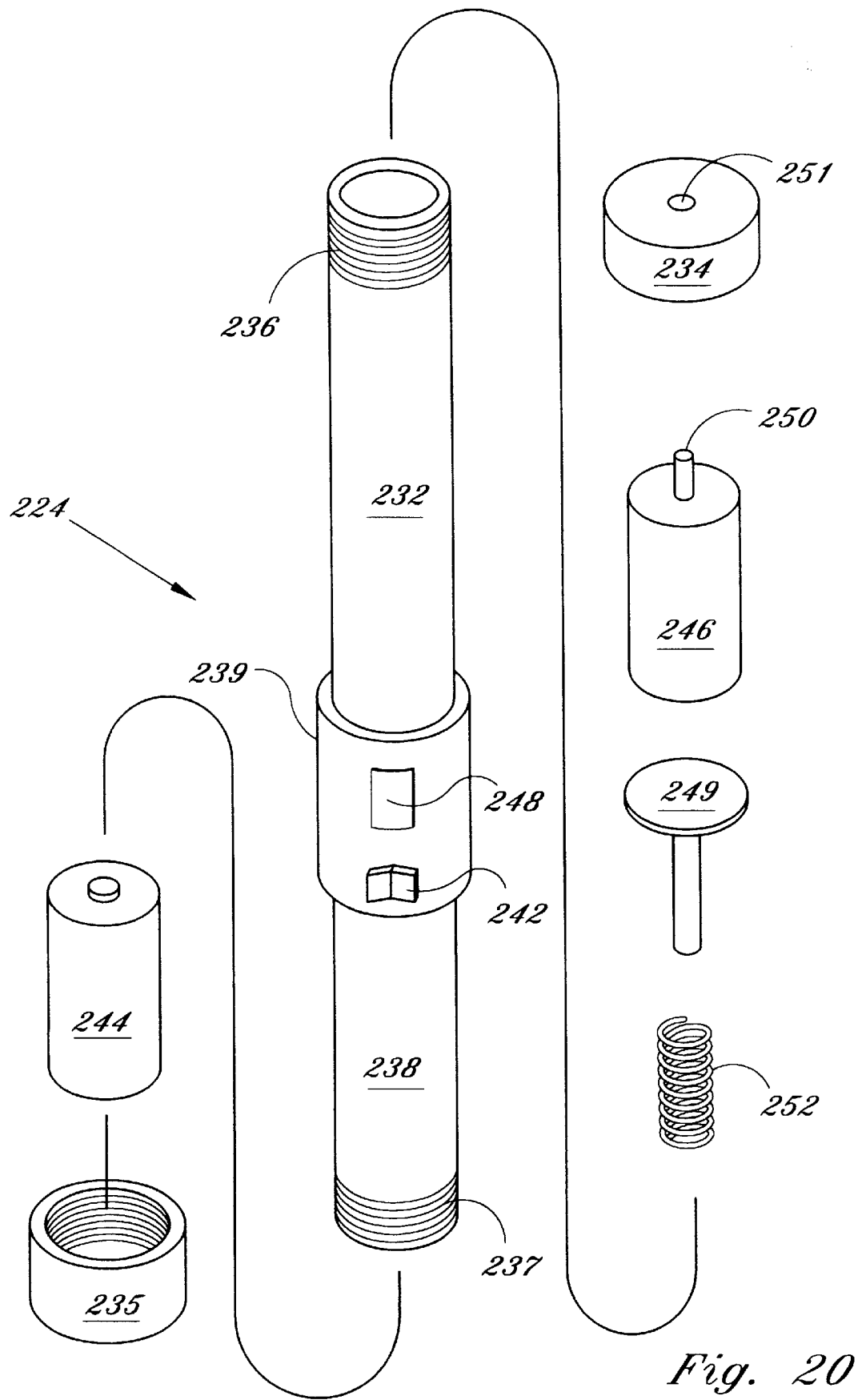
FIG. 20 is an exploded front elevational view of the handle of the third embodiment of the present invention.

Referring now to FIGS. 18–20, handle 224 is attached to cover 212 by sleeve 216 at first area 232. Handle 224 is preferably hollow, and can be made from polyvinylchloride (PVC) pipe, or other suitable material. In one embodiment, handle end cap 234 is removed from first area 232, and sleeve 216 is slid over first area 232 of handle 224, as seen in FIG. 19. Handle end cap 234 can be secured to first area 232 by any suitable means such as threadably engaged with threads 236. Alternately, sleeve 216 can be provided with a suitable closure mechanism such as a hook and loop strap such that end cap 234 would not require removal for attachment of sleeve 216.

Handle 224 includes second area 238, which is the user hand grip area. Hand grip area 238 can be encapsulated in any suitable "spongy" comfortable hand grip material.

Separating first area 232 from second area 238 can be a suitable coupler, such as switch housing 239. Switch housing 239 retains an end of first area 232 and second area 238 as well as providing a housing for controls such as switches 242 and 248.

Switch 242 is preferably a three-position, normally off, rocker-type switch, with a first, normally off, position, a second, retract cover, position, and a third, extend cover, position. Switch 242 is preferably biased in the off position, and can easily be depressed from its normally off center position into either of the active positions by a user's thumb while gripping handle 224.

Switch 242 controls motor 245 which provides drive power for roller assembly 240, which is fully described hereinbelow. Switch 242 can be hardwired to motor 245, or alternately switch 242 can activate a radio-frequency (RF) device housed within handle 224 (not shown), and thereby control motor 245 by RF link. As shown in FIG. 20, suitable battery power for the RF device, represented by battery 244, can be placed within handle 224 by removal of end cap 235. End cap 235 is retained on second area 238 of handle 224 by any suitable means such as threads 237.

As seen in FIG. 20, handle 224 can house a self defense and security mechanism, such as MACE® or tear or pepper gas aerosol container 246, to protect the user. In one embodiment, switch 248 can activate aerosol container 246 by slidably engaging push rod 249 into container 246 thereby pressing container nozzle 250 into end cap 234, resulting in the gas contained therein to be expelled through orifice 251 in end cap 234. Spring 252 biases switch 248 and push rod 249 away from container 246. In operation, orifice 251 in handle 224 can be pointed at a would be assailant, and switch 248 could be pushed forward activating container 246 to eject a debilitating gas toward the assailant.

Alternately, gas container 246 could be replaced with a loud siren, a stun gun, or remote activation mechanism for an installed vehicle alarm security system (not shown).

In addition, handle 224 can be made of a hard material, such as metal, and used as a self-defense club. In this embodiment, sleeve 216 can be attached to handle 224 by a quick release mechanism, such as a band with hook and loop fasteners (not shown).

Figure 22:
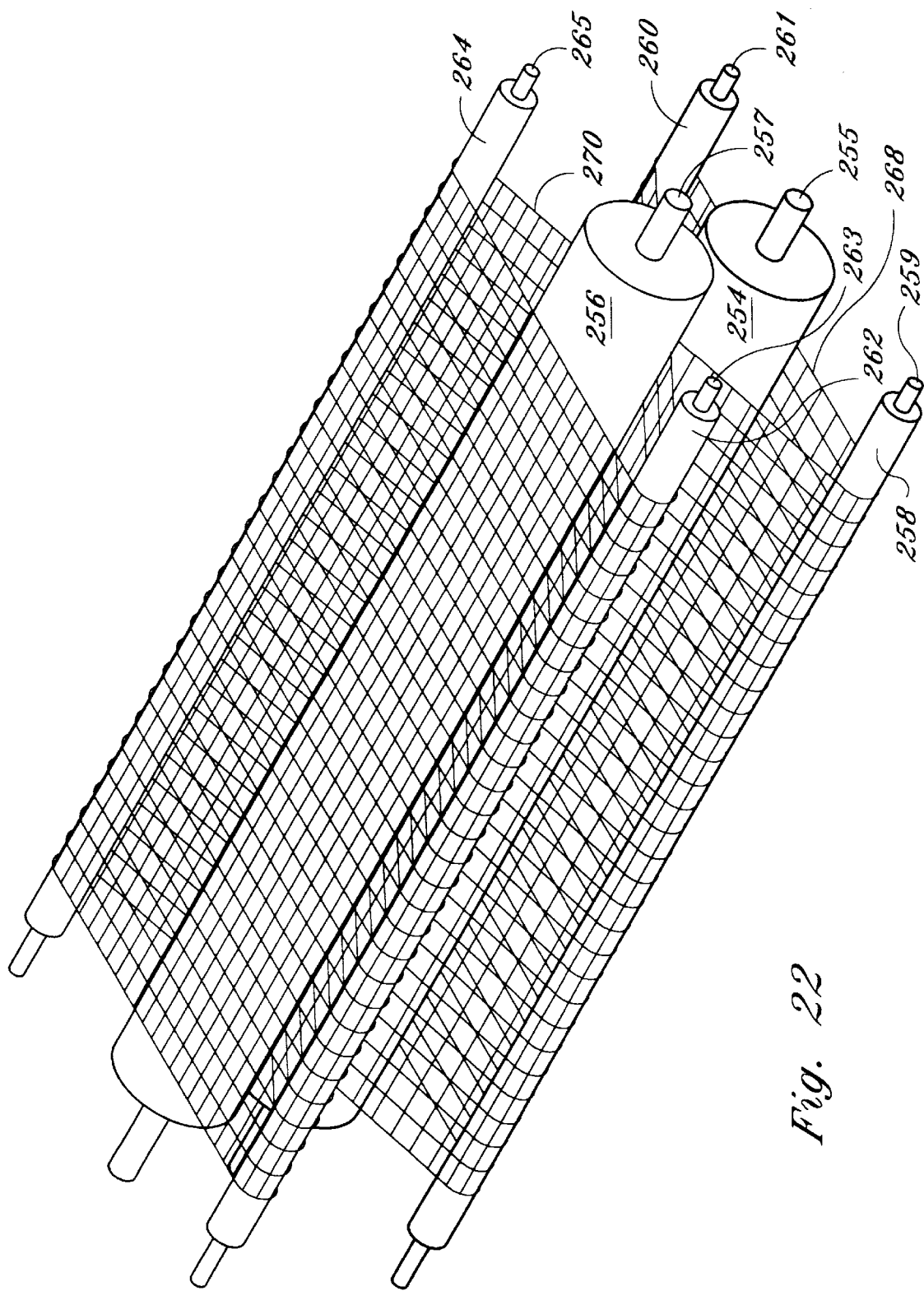
FIG. 22 is a partial perspective view of the rollers and webbing protector of the third embodiment of the present invention.

As stated above, switch 242 on handle 224 activates motor 245. Motor 245 controls roller assembly 240. Roller assembly 240 is shown in FIGS. 22–27. Referring in particular to FIG. 22, roller assembly 240 includes two main rollers 254 and 256. For purposes of an example to describe the invention, roller 254 is selected as the drive roller and roller 256 is selected as a driven roller. However, either roller can be selected as the drive or driven roller.

Associated with drive roller 254 are guide rollers 258 and 260, and associated with driven roller 256 are guide rollers 262 and 264. Drive roller 254 can include a central shaft of rotation 255, and driven roller 256 can included a central shaft of rotation 257. Rollers 254 and 256 can be made of a hard rubber mounted on the central shafts. Each guide roller can include a central shaft of rotation such that guide rollers 258, 260, 262, and 264 will have central shafts of rotation 259, 261, 263, and 265, respectively. The purpose of the central shafts of all the rollers is to provide a means of rotational attachment for the rollers.

Attached around the perimeter of drive roller 254 and guide rollers 258 and 260 is webbing material 268. The orientation of drive roller 254 and guide rollers 258 and 260, when viewed from the end or when looking in the direction of the longitudinal axes of the rollers, is such that webbing material 268 forms a triangular-shaped webbing protector. The triangular shaped orientation of webbing protector 268 may alternately be other than a triangle by using only one guide roller, or more than two guide rollers, but is preferably triangular.

In a similar manner, webbing protector 270 extends around the perimeter of driven roller 256 and guide rollers 262 and 264. Webbing protectors 270 and 268 form a pair of triangles adjacent each other at the vertices of the triangles formed by the drive roller 254 and driven roller 256.

The webbing material can be made of nylon or plastic, and as can be seen in FIG. 22, is structured in the form of large open areas interconnected by bands or strips of material giving the general appearance of a "chain-link" fence, with openings preferably in the order of ¾" square. The purpose of this webbing material is twofold and explained hereinbelow.

As will be further described below, vehicle cover 212 is fed through rollers 254 and 256 by the frictional force of rollers 254 and 256 rotating against the cover material. The open areas of the webbing material permit the surface of rollers 254 and 256 to make contact directly with the cover material, thus maintaining the frictional force of rollers 254 and 256 against cover 212. When the cover 212 leaves the rollers, webbing 268 and 270 guides the cover material away from the rollers, so that cover 212 will not wrap around either roller 254 or 256 and jam the rollers.

An additional result of webbing 268 and 270 is that, when being retracted, cover 212 automatically is folded in undulating or accordion style and stored in a horizontal manner into housing 210. This permits use of a smaller sized housing 210 that will fit behind the axle assembly of most vehicles. The automatic accordion type folding of cover 212 into housing 210 is believed to be due to the triangular shape of webbing 268 and 270 as it runs around the perimeter of the rollers as described hereinabove.

As mentioned hereinabove, when an operator is retracting cover 212 into housing 210, the cover may not be uniformly distributed across rollers 254 and 256. Therefore, in attaching rollers 254 and 256, provision has to be made to maintain even force on cover 212 even if bunched to one side of the rollers. This can be accomplished by a resilient securing strategy for the ends of the rollers, while simultaneously maintaining drive power to the rollers to maintain their rotation.

Figure 23:
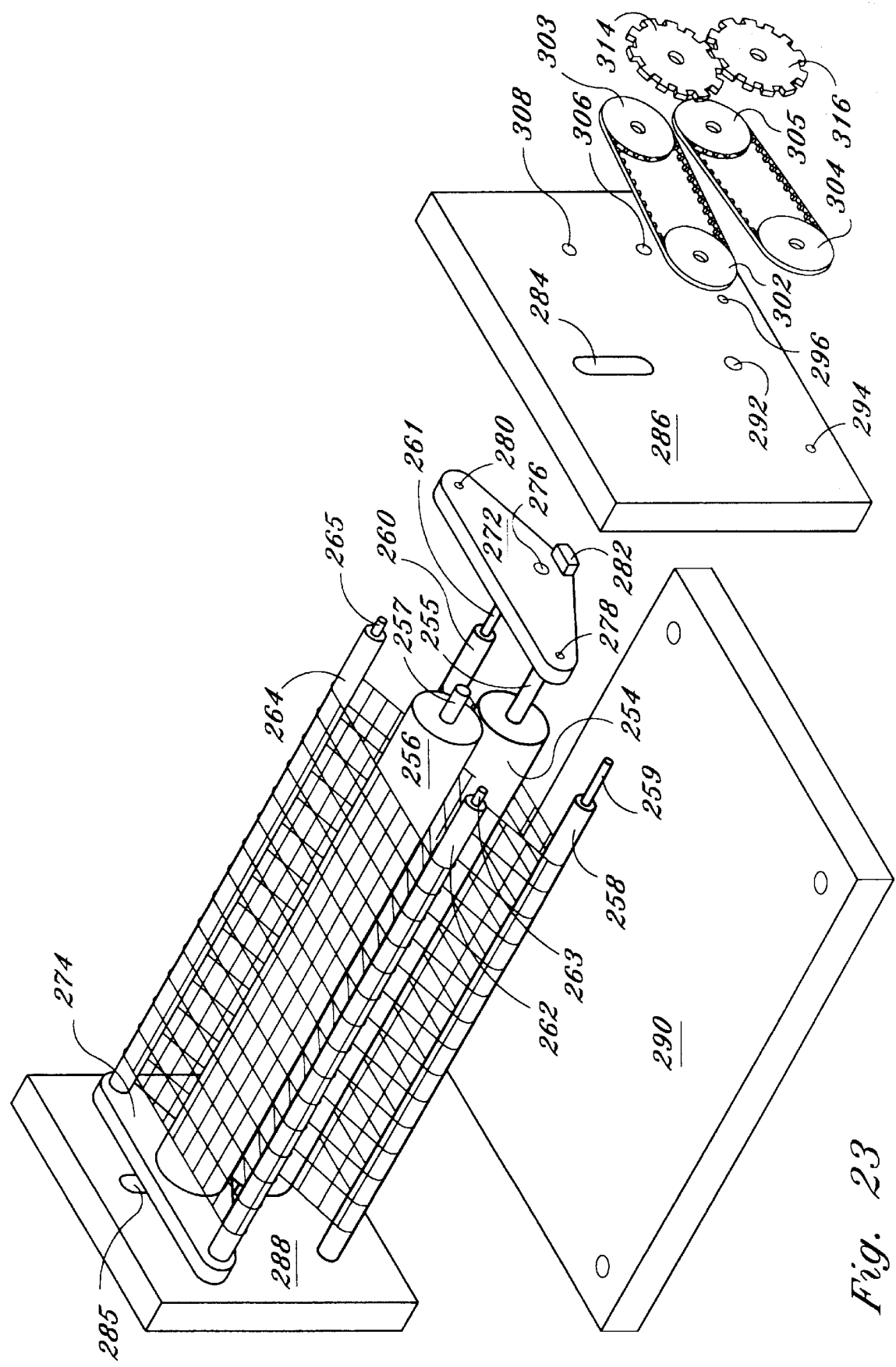
FIG. 23 is a partial exploded view in perspective of the third embodiment of the present invention.

Referring now to FIG. 23, driven roller 256, and guide rollers 262 and 264 are retained by identical plates 272 and 274. One end of central shafts 257, 263, and 265 engage apertures 276, 278, and 280, respectively, of retaining plate 272. Retaining plate 274 is attached to central shafts 257, 263, and 265, of rollers 256, 262, and 264, at the end opposite retaining plate 272, in like manner. Retaining plates 272 and 274 include identical protrusions shown as 282 on plate 272.

Rollers 256, 262, and 264 retained in retaining plates 272 and 274, and rollers 254, 258, and 260 are held in place by end plates 286 and 288. End plates 286 and 288 can be attached to base plate 290. Central shaft 257 of roller 256 extends through retaining plate 272 and into slot 284 in end plate 286, and through retaining plate 274 and into slot 285 in end plate 288. Slots 284 and 285 provide for vertical movement of driven roller 256 and guide rollers 262 and 264 with respect to drive roller 254. Protrusion 282 on retaining plate 272 and an identical protrusion on retaining plate 274 fit into slots 284 and 285, respectively, to maintain the orientation of the triangle formed by rollers 256, 262, and 264, as it moves up and down in the vertical plane.

Central shaft 255 of drive roller 254 fits into aperture 292 of end plate 286, and shafts 259 and 261 fit into apertures 294 and 296, respectively. The end of shafts 255, 259, and 261 opposite end plate 286, fit into corresponding apertures in end plate 288. Thus, webbing triangle 270 formed by rollers 256, 262, and 264 moves in the vertical plane in relation to webbing triangle 268 formed by rollers 254, 258, and 260 which are fixed by end plates 286 and 288. The vertical movements provided by slots 284 and 285 are independent of each other, allowing one end of rollers 256, 262, and 264 to be moved in the vertical plane independently of the opposite end of these rollers. Therefore, the relationship between rollers 256 and 254, when viewed perpendicular to their longitudinal axes, can be parallel or nearly any acute angle.

Figure 24:
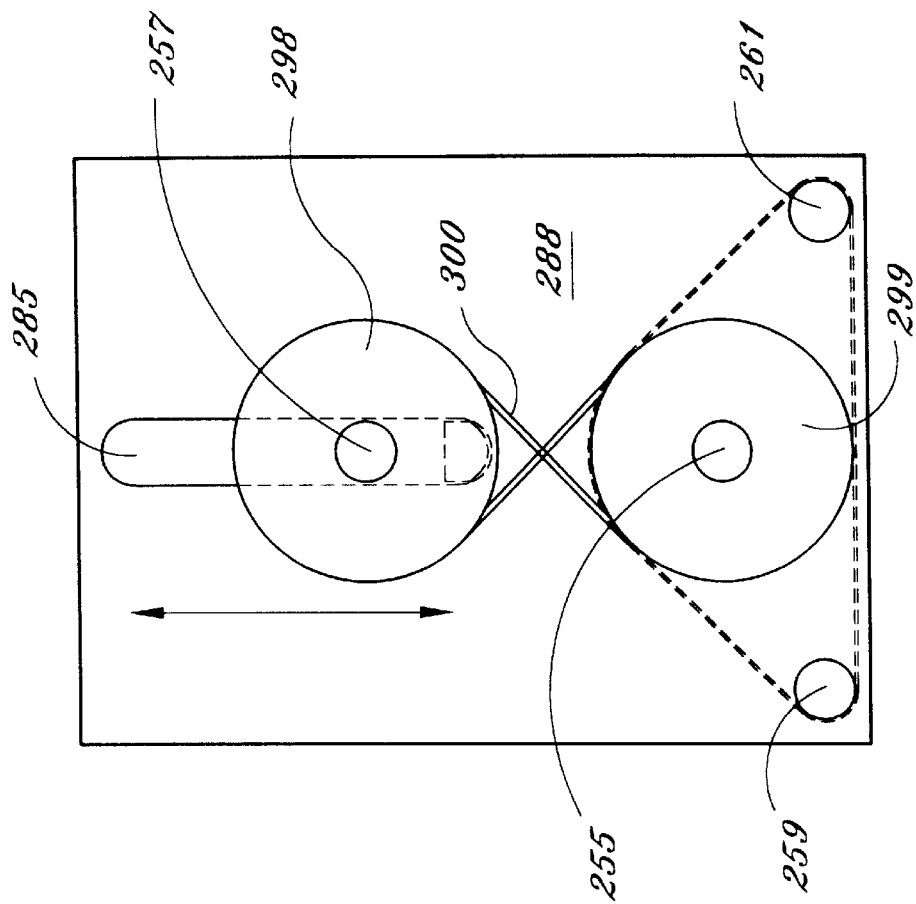
FIG. 24 is an end elevational view of the third embodiment of the present invention.
Figure 25:
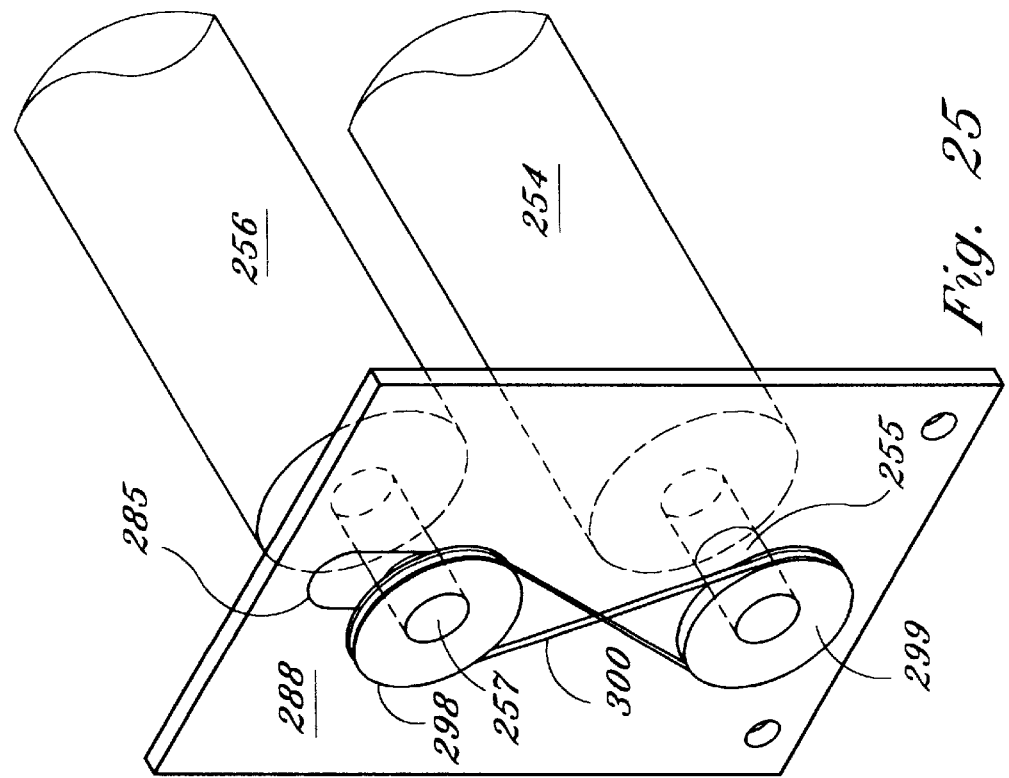
FIG. 25 is a perspective view of the embodiment illustrated in FIG. 24.

Referring now to FIGS. 24 and 25, end plate 288 is shown on the side opposite the rollers. Pulley 298 is mounted to an end of central shaft 257, and pulley 299 is mounted to an end of central shaft 255. A resilient belt 300, such as a suitable sized O-ring, is installed between pulleys 298 and 299 to maintain pressure against roller 254 from roller 256.

Figure 27:
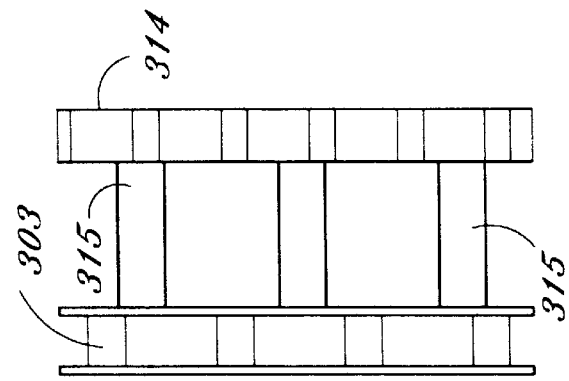
FIG. 27 is a side elevational view of the pulley and gear assembly of the third embodiment of the present invention.
Figure 26:
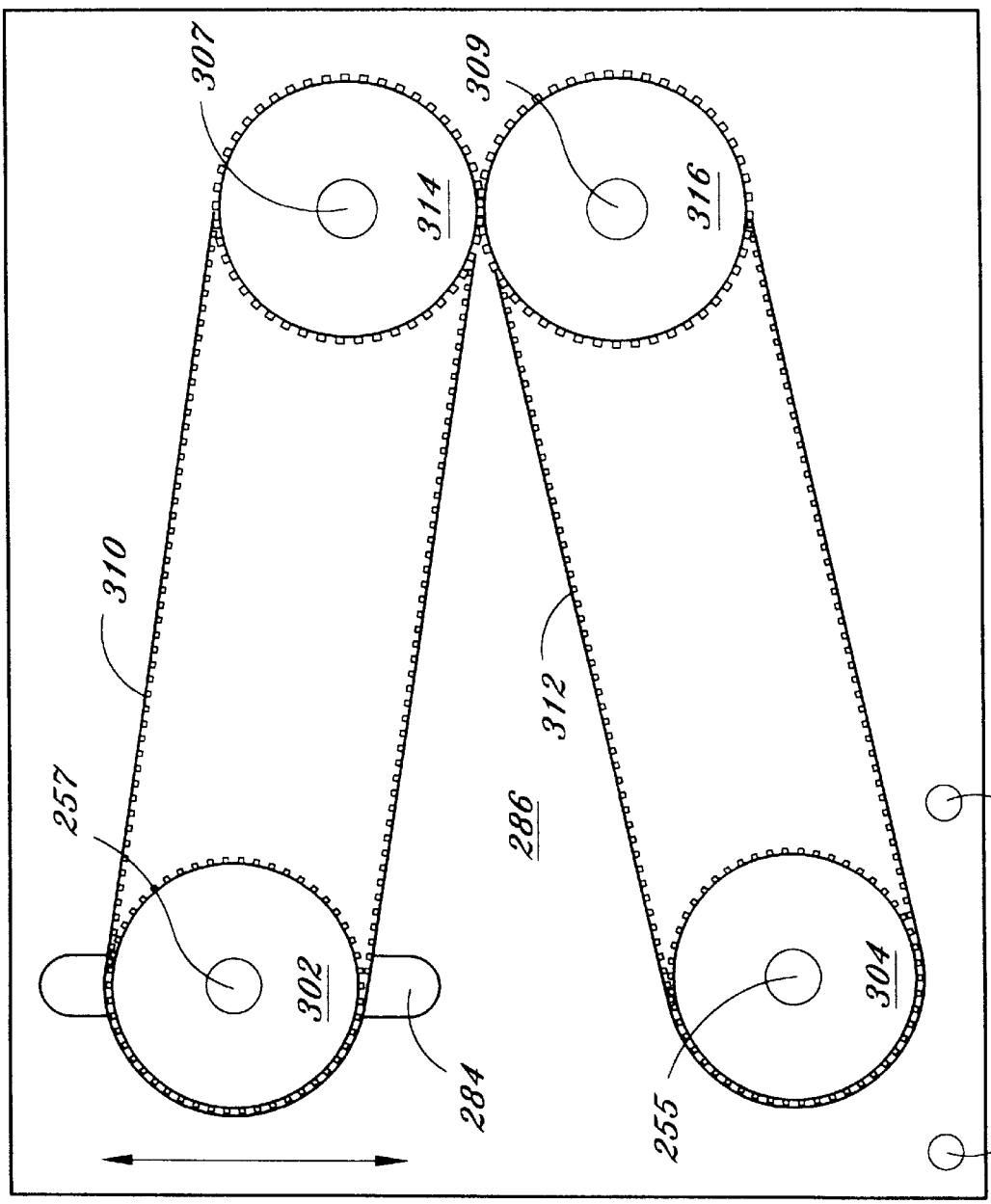
FIG. 26 is a side elevational view showing the drive mechanism of the third embodiment of the present invention.

Referring further to FIG. 23, and to FIGS. 26 and 27, end plate 286 is shown on the side opposite the rollers. Pulley 302 is mounted to an end of shaft 257, and pulley 304 is mounted to an end of shaft 255. Pulleys 302 and 304 are preferably toothed pulleys. Pulleys 303 and 305 are mounted to end plate 286 at suitable apertures 306 and 308 by suitable means such as shafts 307 and 309. Pulleys 303 and 305 are preferably toothed to match pulleys 302 and 304. Toothed belts 310 and 312 interconnect pulleys 302 with 303, and 304 with 305, respectively. Gear 314 is mounted to pulley 303 by any suitable means such as bolts separated by spacers 315, as shown in FIG. 27. Gear 316 is mounted to pulley 305 in an equivalent manner. Apertures 308 and 306 in end plate 286 are positioned such that gears 314 and 316 mesh, as shown in FIG. 26.

Alternately, belts 310 and 312 can be chains, and pulleys 302 and 304, and pulleys 303 and 305 can be mating sprockets, or any other suitable configuration.

Figure 21:
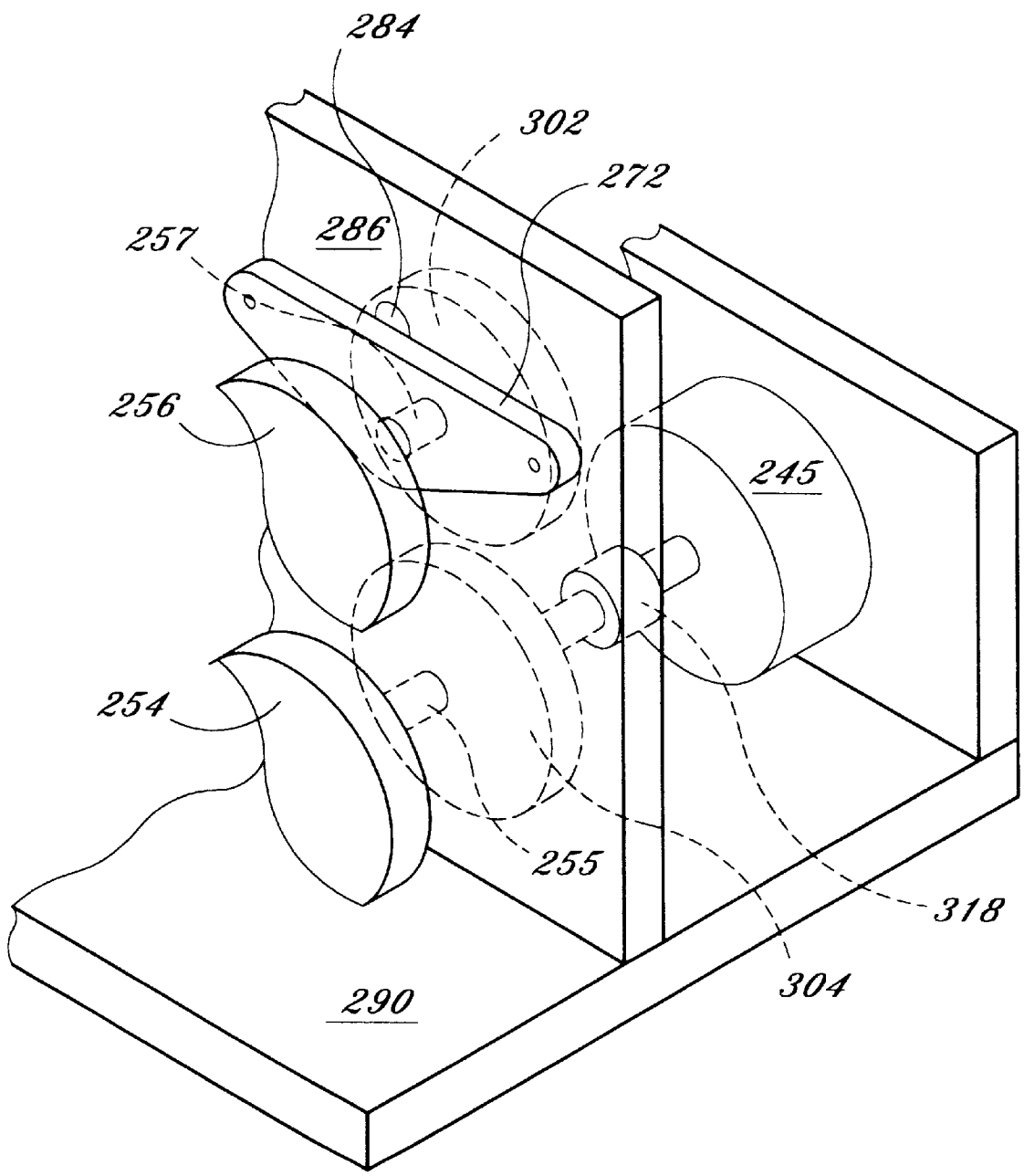
FIG. 21 is a partial perspective view of the drive motor of the third embodiment of the present invention.

Motor 245 is mounted to shaft 255 by any suitable manner, such as coupler 318, illustrated in FIG. 21. As stated herein above, motor 245 is controlled either via hardwired or RF link from switch 242 on handle 224.

Motor 245 causes shaft 255 to rotate, which rotates driven roller 254 and pulley 304. If pulley 304 is rotated, belt 312 will rotate pulley 305. Pulley 305 has gear 316 mounted to it and gear 316 will rotate with pulley 305. Gear 316 is in mesh with gear 314, and rotation of gear 316 causes gear 314 to rotate. Gear 314 is mounted to pulley 303 which causes pulley 303 to rotate with gear 314 causing belt 310 to rotate, which will in turn rotate pulley 302. Pulley 302 is mounted to central shaft 257 causing roller 256 to rotate.

The rotation transferred from motor 245, directly to roller 254 and to roller 256, through the pulleys, belts, and gears described, is independent of the position of central shaft 257 of roller 256 in slot 284. The rotational force placed on the driven roller 256 by the drive mechanism herein described includes a component of force that presses roller 256 against 254. This force component, in conjunction with the force from O-ring 300 pressing roller 256 against 254 near end plate 288, as described hereinabove, causes an evenly distributed force along rollers 254 and 256. This evenly distributed force, in conjunction with the vertical movement independently provided by both ends of roller 256, as described above, causes rollers 256 and 254 to exert constant pressure on cover 212 as cover 212 is retracted or extended through rollers 254 and 256, even when cover 212 is bunched to one end of the rollers.

FIG. 17 shows cover 212 placed between rollers 256 and 254 and webbing material 270 and 268. As stated herein above, as cover 212 is retracted into housing 210, webbing material 268 and 270 prevents cover 212 from wrapping around rollers 254 and 256, and further causes cover 212 to naturally fold into the accordion folds as seen in FIG. 13.

The description of the rollers that move in the vertical plane verses the rollers that remain fixed can be interchanged, such that the upper rollers are fixed and the lower rollers move vertically. Similarly, the location of the drive motor, and some or all of the pulleys, gears, and belts can be varied. The description hereinabove is intended to be an example of one implementation or embodiment that is intended to convey the invention, but the invention is not meant to be limited to this one example.

Alternate Embodiment of Cover for use with Third Embodiment:

Referring to FIG. 30, an alternate embodiment of cover 212 is illustrated as cover 212' on a vehicle. Cover 212' is similar to cover 212 for use with the third embodiment of the present invention with the addition of air chambers 400 and 402. When cover 212' is deployed on a vehicle, air chambers 400 and 402 are positioned to protect the vehicle from damage due to harmful contact around the perimeter of the vehicle. Potential harmful contact may result from adjacent car doors, shopping carts, roller bladers, and the like.

In the alternate embodiment, air chambers 400 and 402 can be any form of cushioning such as foam, rubber, polyvinylchloride, cotton, or synthetic fabrics, or the like that can protect the vehicle from the above mentioned hazards and yet still be storable within the cover housing.

Referring to FIG. 31, air chambers 400 and 402 can be connected together at intersections 403 and 404 or can be separate air chambers. Air chambers 400 and 402, and any number of additional air chambers, can be included on cover 212' to form nearly any shape or aesthetic design on the surface of the vehicle. For example, air chambers 400 and 402 can be made approximately 6 inches in diameter and have a larger diameter near the doors of the vehicle, as shown in FIGS. 30 and 31. Air chambers 400 and 402 can be integrally made with cover 212' or they may be separately made and connected to cover 212' by any suitable method such as sewn and/or glue.

Air chambers 400 and 402 can be connected together at intersections 403 and 404, and extend to outlet port 405 and inlet port 406, respectively.

Referring to FIG. 32, an air pump 408 can be suitably connected to housing 210' for inflation of air chambers 400 and 402. Referring also to FIG. 33, inlet port 406 can be connected to air pump outlet fitting 410. Inlet port 406 is positioned over pump outlet fitting 410 and a conventional compression collar fitting 412 can be secured around fitting 410 between pump 408 and flange 413, forming an airtight fitting. Air pump 408 is activated by electrical control 414. As described below, electrical control 414 can automatically activate air pump 408 upon deployment of cover 212'.

Referring to FIG. 34, handle 224' is connected to cover 212' by split sleeve 216'. Outlet port 405 connects to outlet fitting 415 on handle 224' in a similar manner as described above for the attachment to air pump 408. Outlet fitting 415 is connected through handle 224' to exhaust end 416. Exhaust end 416 has an openable valve cap 418, which releases air, trapped within air chambers 400 and 402, when in the open position.

In operation, cover 212' is deployed in the same manner as cover 212 described herein above. When handle 224' is attached to a preselected position at the front of the vehicle, a switch, such as 450 illustrated in FIG.30, placed in a suitable location on the front of the vehicle, Us depressed and air pump 408 will be activated by control 414. Control 414 can be electrically connected to switch 450 that is activated by attachment of handle 224' by RF link, or alternately hardwired. The inflation rate can be preselected to be nearly any rate and is preferably approximately 60–120 seconds for complete inflation of air chambers 400 and 402. Air pump 408 will automatically shut off when a preset inflation pressure in chambers 400 and 402 is reached. A conventional sensor can be use to sense when the preset inflation pressure is reached and air pump 408 will then be shut off sealing the air chambers. The air chambers 400 and 402 are made from a plastic material that allows some expansion due to heating from the sun, and can include overpressure protection. Valve cap 418 must be closed in order to inflate air chambers 400 and 402.

For storage of cover 212', valve cap 418 is opened and the air under pressure within air chambers 400 and 402 will quickly be exhausted. As cover 212' is pulled into housing 210', any remaining air within chambers 400 and 402 will be expelled by the rollers within roller assembly 240'.

Hence, the instant invention has been shown and described herein in what is considered to be the most practical and preferred embodiment. It is recognized, however, that departures may be made therefrom within the scope of the invention and that obvious modifications thereto will occur to a person skilled in the art.

What is claimed is:

1. A vehicle cover and storage and deployment apparatus comprising:

a vehicle cover having a first end and a second end;

a generally low profile hollow housing adapted to receive said vehicle cover in an essentially accordion, non-spooled orientation;

means for moving said vehicle cover, said means for moving being in frictional engagement with said vehicle cover for assisting an operator in moving said vehicle cover between a stored position within said housing and an extended position at least partially covering a vehicle;

said housing being connected to an underside of the vehicle;

said means for moving including at least one drive roller frictionally cooperating with said vehicle cover;

means for preventing said vehicle cover from wrapping around and jamming said at least one drive roller, said means for preventing jamming including at least one guide roller;

a handle removably connected to said cover at said first end, said handle including means for controlling said means for moving;

at least one inflatable air chamber connected to said vehicle cover;

an air pump mounted to said housing and in fluid communication with said at least. One air chamber; and a manually openable and closeable exhaust valve mounted to said handle and in fluid communication with said at least one air chamber;

said air pump including means for activation, said pump being deactivated at a preselected internal pressure of said at least one air chamber.

2. The apparatus according to claim 1, wherein said means for activation includes a switch connected to a preselected portion of a front of the vehicle, said switch being depressible by said handle when placed in a preselected position on the front of the vehicle.

3. The apparatus according to claim 1, wherein said at least one air chamber extends at least partially around a perimeter of the vehicle and is inflated to said preselected internal pressure when said vehicle cover is in said extended position covering the vehicle and said handle is placed in a preselected position on a front of the vehicle.

4. The apparatus according to claim 1, wherein said at least one air chamber is at least partially deflated by manually opening said exhaust valve, and said at least one air chamber is completely deflated by said means for moving when said vehicle cover is moved into said stored position within said housing.

* * * * *